(12) United States Patent
Soisson et al.

(10) Patent No.: US 10,450,438 B2
(45) Date of Patent: Oct. 22, 2019

(54) PURIFICATION OF PLASTICIZER AND USE THEREOF IN A POLYMER PRODUCTION PROCESS AND PLANT

(71) Applicant: ExxonMobil Chemical Patents Inc., Baytown, TX (US)

(72) Inventors: John P. Soisson, Houston, TX (US); Christopher B. Friedersdorf, Kingwood, TX (US); Kyle B. Hancock, Houston, TX (US); Florin Barsan, Pearland, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 182 days.

(21) Appl. No.: 15/517,440

(22) PCT Filed: Oct. 2, 2015

(86) PCT No.: PCT/US2015/053690
§ 371 (c)(1),
(2) Date: Apr. 6, 2017

(87) PCT Pub. No.: WO2016/076969
PCT Pub. Date: May 19, 2016

(65) Prior Publication Data
US 2018/0237612 A1    Aug. 23, 2018

Related U.S. Application Data

(60) Provisional application No. 62/078,771, filed on Nov. 12, 2014.

(51) Int. Cl.
| C08K 5/01 | (2006.01) |
| C08F 6/00 | (2006.01) |
| C08K 5/00 | (2006.01) |
| C08J 3/18 | (2006.01) |
| C08J 3/20 | (2006.01) |

(52) U.S. Cl.
CPC ............... C08K 5/01 (2013.01); C08F 6/003 (2013.01); C08J 3/18 (2013.01); C08J 3/20 (2013.01); C08K 5/0016 (2013.01); C08J 2323/16 (2013.01)

(58) Field of Classification Search
CPC .. C08K 5/01; C08K 5/0016; C08J 3/20; C08J 3/18; C08F 6/003
See application file for complete search history.

(56) References Cited

U.S. PATENT DOCUMENTS

| 7,163,989 | B2 | 1/2007 | Friedersdorf |
| 7,910,637 | B2 | 3/2011 | Kiss et al. |
| 8,080,610 | B2 | 12/2011 | Kiss et al. |
| 8,221,524 | B2 | 7/2012 | Mitariten |
| 8,318,846 | B2 | 11/2012 | Ito et al. |
| 8,388,740 | B2 | 3/2013 | Sohn et al. |
| 2004/0154957 | A1 | 8/2004 | Keeney et al. |
| 2007/0105999 | A1* | 5/2007 | De Munck ............. C07C 67/56 524/296 |
| 2009/0076216 | A1* | 3/2009 | Kiss ........................ C08F 10/00 524/579 |

FOREIGN PATENT DOCUMENTS

| CA | 400837 | 11/1941 |
| JP | 2000-302919 A | 10/2000 |
| WO | 2005/021482 | 3/2005 |
| WO | 2009/035580 | 3/2009 |

OTHER PUBLICATIONS

Ravishankar, P.S., "Treatise on EPDM", Rubber Chemistry and Technology, 2012, vol. 85, No. 3, pp. 327-349.
"Liquid-Liquid Extraction and Other Liquid-Liquid Operations and Equipment", Perry's Chemical Engineers Handbook, 8th Edition, 2007, Section 15, pp.(15-1)-(15-105).
"UOP Adsorbents: Purification of Olefin and Polymer Process Streams", UOP LLC, Jul. 2011.

* cited by examiner

*Primary Examiner* — Peter D. Mulcahy

(57) ABSTRACT

The invention relates to purification of plasticizer, particularly for use in a polymer production process and plant. More particularly, the invention relates to purification of plasticizer, such as by gas stripping, for use in a process for in-line blending of polymer and plasticizer.

22 Claims, 2 Drawing Sheets

PURIFICATION OF PLASTICIZER AND USE THEREOF IN A POLYMER PRODUCTION PROCESS AND PLANT

PRIORITY CLAIM

This application is a National Phase Application claiming priority to PCT Application Serial No. PCT/US2015/053690 filed Oct. 2, 2015, and claims priority to U.S. Ser. No. 62/078,771, filed Nov. 12, 2014, the disclosure of which is incorporated herein by reference in its entirety.

FIELD OF THE INVENTION

The invention relates to purification of plasticizer, particularly for use in a polymer production process and plant. More particularly, the invention relates to purification of plasticizer for use in a process for in-line blending of polymer and plasticizer.

BACKGROUND OF THE INVENTION

Typical applications of polymers, such as polyolefins, benefit from a polymer having useful properties over a wide range of temperatures and under a variety of conditions. For example, the ability to adjust the stiffness-toughness balance and processability of polyolefins is desirable to meet the needs of a broad range of applications at a lower cost. Stiffness-toughness balance may be adjusted, for example, by blending polymers and plasticizers. For instance, a plasticizer added to a high molecular weight, highly crystalline stiff polyolefin can soften the structure to improve the toughness of such a material. Plasticizers with low glass transition temperature also can extend the flexibility of plastics to lower temperatures by lowering the glass transition temperature of the polymer-plasticizer blend. Plasticizers are also beneficial during polymer processing due to improvements in a number of characteristics, such as lubricity, viscosity, ease of fusion, etc. The concept of plasticization, the benefits of using plasticizers, and the different methods of using plasticizers are described in J. K. Sears, J. R. Darby, The Technology of Plasticizers, Wiley, New York, 1982, which is directed to the plasticization of poly(vinyl chloride).

Many polymers such as ethylene-propylene rubber or ethylene-propylene-diene (EPDM) rubber products, for example, contain mineral oil as a plasticizer. Blending (e.g., in-line) of mineral oil with a high molecular weight EPDM polymer often significantly reduces the Mooney viscosity of the product relative to that of the polymer. This generally leads to efficient finishing of the oil-extended polymer and also facilitates compound mixing, extrusion, and other processing of the product. However, due to the often large loadings of extension oil in these products, extension oil is typically stored and transported in bulk (e.g., in railcars or tank trucks). While the freshly produced oils may be low in oxygen and moisture content, bulk storage and transport operations generally do not prevent exposure to air and moisture, thereby leading to potential contamination. For example, bulk storage tanks for low-volatility liquids are generally vented directly to the atmosphere, or are equipped with pressure-vacuum vents that draw in atmospheric air when pressure drops below a set value (as when liquid level drops). Tank trucks may be similarly equipped. Further exposure can also occur as loading and unloading equipment (e.g., flexible hoses) are attached to the bulk transport equipment. The oils also tend to contain a fraction of relatively volatile components (e.g., normal boiling point below 120° C.), including sulfur compounds, nitrogen compounds, and oxygenates, that can affect polymer production processes.

Polymer production processes are often sensitive to impurities such as moisture and oxygen. For example, in a solution metallocene process for making polymers such as EPDM rubber, the presence of oxygen in the polymer finishing section can generate undesirable product gels due to free-radical polymer chain cross-linking. Also, introduction of moisture in the recycle purification phase can shorten adsorbent bed life and cause icing in equipment upstream that is operated at low temperature. In addition, oxygen, moisture, and other nucleophiles (e.g., oxygenates, sulfur compounds, nitrogen compounds, halogenated compounds) are highly reactive with metallocene catalysts (and many other catalyst types), which could negatively affect reactor control, product quality, and plant efficiency.

Many plasticizers contain moisture, oxygen, reactive impurities, polymer gels, and solids as a result of the original manufacturing process or from exposure or cross-contamination during storage and handling. When added to a polymerization process, some impurities may cause undesirable impact on product quality or process efficiency. In other situations, the impurities may partition into multiple process streams, react with other stream components to form other reactive impurities, or concentrate within the polymerization plant over time, thus causing undesirable results.

It can be costly and inefficient to remove impurities after introduction to a polymerization process. For instance, multiple streams may require purification, impurities may be at a low concentration, properties of impurities and other stream components may be very similar, or the process stream properties (e.g., high viscosity, high pressure) may complicate the use of conventional purification technologies. It can also be costly and of limited effectiveness to mitigate the effects of impurities through actions, such as adding product stabilizers, installing gel filters, or changing equipment metallurgy.

U.S. Pat. No. 7,910,637 describes a process for in-line blending of polymers and plasticizers in a polymerization plant, i.e., before the recovery and pelletizing of the one or more solid polymer blend components.

U.S. Pat. No. 8,221,524 describes a method for achieving low oxygen levels in a natural gas stream without the use of a catalytic system. For example, this reference describes a method using membrane treatment for the removal of the bulk of $CO_2$ and oxygen in the natural gas feed and the addition of a pressure swing adsorption (PSA) system using a carbon molecular sieve adsorbent for the adsorption of residual oxygen.

U.S. Pat. No. 8,388,740 describes a method for removal of dissolved oxygen from hydrocarbon streams. For example, this reference describes a process which includes mixing hydrocarbons streams with an oxygen free gas to form a gas-liquid mixture; the mixture is allowed to disengage into a gas stream and a liquid stream, thereby removing dissolved oxygen from the hydrocarbon stream.

Additional related background references on polymer production process and purification include: U.S. Pat. No. 7,163,989; P. S. Ravishankar, "Treatise on EPDM", *Rubber Chemistry and Technology*, 85, 327-349 (2012); Perry's Chemical Engineers' Handbook, 8th Edition (2007); and "UOP Adsorbents: Purification of olefin and polymer process streams," UOP LLC, July, 2011.

There is a need for an effective and efficient process for removing impurities from plasticizers before adding them to polymers in a polymer production process (e.g., via in-line blending). The present invention addresses this need by providing a process for purifying plasticizer particularly for use in a polymer production process and plant.

SUMMARY OF THE INVENTION

Provided is a process for purifying plasticizer and for producing a plasticized polymer. In one embodiment, the invention encompasses a process for producing a plasticized polymer, comprising the steps of: (a) providing a reactor, a separator connected to the reactor, and a vessel containing a plasticizer (preferably off-line produced); (b) contacting in the reactor olefin monomers with a catalyst to form a polymer reactor effluent comprising a polymer-monomer mixture, optionally in the presence of a solvent; (c) passing the polymer reactor effluent from the reactor through the separator to form a polymer-rich phase and a polymer-lean phase; (d) separating the polymer-lean phase from the polymer-rich phase; (e) purifying the plasticizer by at least one of: gas stripping, fixed-bed sorption, chemical scavenger, distillation, liquid-liquid extraction, filtration, gravity settling, and centrifugation to produce a purified plasticizer; (f) feeding the purified plasticizer to the process after step (b) to form a plasticized polymer blend stream; and (g) obtaining a plasticized polymer from the plasticized polymer blend stream.

In a preferred embodiment, the plasticizer is purified by gas stripping, comprising the steps of: (i) heating the plasticizer to a temperature of about 40° C. to about 300° C. to increase the vapor pressure of volatile impurities present in the plasticizer; (ii) contacting the plasticizer with an inert gas using a contacting device to form a purified plasticizer and a vapor product comprising volatile impurities and the inert gas; and (iii) separating the purified plasticizer from the vapor product using a separator device.

The invention also encompasses a plant for producing a plasticized polymer, comprising: (a) a feed containing olefin monomers in a hydrocarbon solvent; (b) a reactor to which the olefin monomers and a catalyst are supplied to react to form a polymer reactor effluent, optionally in the presence of a solvent; (c) a separating means downstream of the reactor to separate the hydrocarbon solvent and unreacted olefin monomer from the polymer reactor effluent, which separating means includes a separator to separate the polymer reactor effluent into a polymer-rich phase and a polymer-lean phase; (d) a recycling means for recycling polymer-lean phase back to the reactor; and (e) a plasticizer supply means for supplying a plasticizer downstream of the reactor. The plasticizer supply means comprises (i) a pressure source, (ii) a heater, (iii) a vessel in which an inert gas is added to a plasticizer. (iv) a contacting device to contact the plasticizer with the inert gas, (v) a separator device to separate the vapor product from the purified plasticizer, and (vi) a feeding means for feeding the purified plasticizer downstream of the reactor.

DETAILED DESCRIPTION

Figure 1:
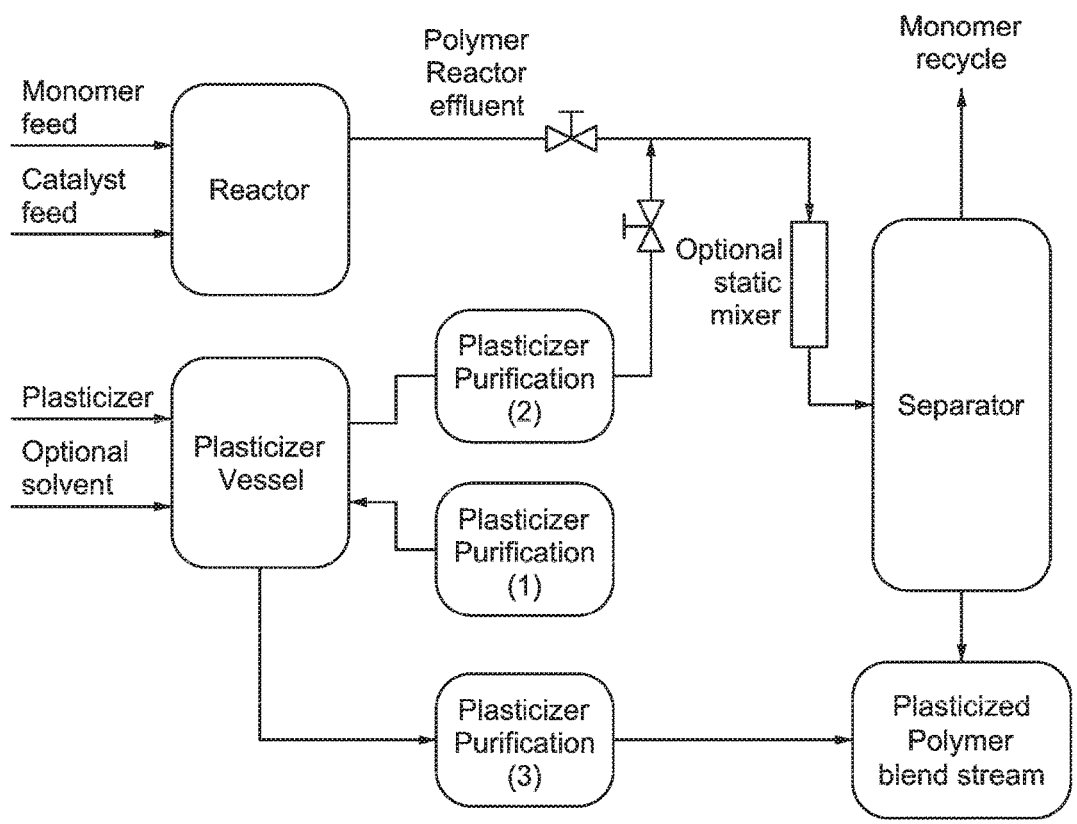
FIG. 1 is an exemplary process for producing a plasticized polymer by purifying and in-line blending in a polymer production process. Purification of plasticizer can be done as illustrated at points (1), (2), and/or (3).

Provided is a process for purifying plasticizer and for producing a plasticized polymer. In one embodiment, the invention encompasses a process for producing a plasticized polymer, comprising the steps of (a) providing a reactor, a separator (e.g., high-pressure separator) connected to the reactor, and a vessel containing a plasticizer (preferably off-line produced); (b) contacting in the reactor olefin monomers with a catalyst to form a polymer reactor effluent comprising a polymer-monomer mixture, optionally in the presence of a solvent; (c) passing the polymer reactor effluent from the reactor through the separator to form a polymer-rich phase and a polymer-lean phase; (d) separating the polymer-lean phase from the polymer-rich phase; (e) purifying the plasticizer by at least one of: gas stripping, fixed-bed sorption, chemical scavenger, distillation, liquid-liquid extraction, filtration, gravity settling, and centrifugation to produce a purified plasticizer; (f) feeding the purified plasticizer to the process after step (b) to form a plasticized polymer blend stream; and (g) obtaining a plasticized polymer from the plasticized polymer blend stream. Optionally, a solvent may be present in the reactor and/or the polymer reactor effluent.

Preferably, the plasticizer is provided, prior to purification as described in step (e), at a pressure above atmospheric pressure, generally at a temperature close to ambient temperature. Optionally, the plasticizer can be heated to a temperature that facilitates transport (e.g., above plasticizer melting point or below a viscosity limit, depending on the type of process equipment).

The plasticizer can be purified at any point during the process, either continuously or non-continuously. Preferably, the plasticizer is purified between steps (a) to (d), or between steps (b) to (d). In one embodiment, the plasticizer is continuously purified as the polymer is being produced, and fed to the polymer process after step (b). Preferably, the plasticizer is fed to the process (e.g., to the polymer-rich phase) after step (d). In one embodiment, a second phase (e.g., free water) is removed from the plasticizer. In a preferred embodiment, the plasticizer is continuously purified and continuously supplied to the polymer production process. Details of an exemplary continuous polymer production process, including in-line blending of plasticizer and polymer, are described in U.S. Pat. No. 7,910,637, incorporated by reference herein in its entirety.

The separator preferably concentrates the polymer effluent from the reactor by removing the polymer-lean phase. In one embodiment, the separator is a high-pressure separator. In one embodiment, the process of the invention includes a high-pressure separator that flashes off volatiles, followed by a low-pressure separator.

Gas Stripping

In a preferred embodiment, the plasticizer is purified by gas stripping. In such an embodiment, the process preferably comprises the steps of: (i) heating the plasticizer to a temperature of about 40° C. to about 300° C. to increase the vapor pressure of volatile impurities present in the plasticizer and optionally reduce the viscosity of the plasticizer; (ii) contacting the plasticizer with an inert gas using a contacting device to form a purified plasticizer and a vapor product comprising volatile impurities and the inert gas; and (iii) separating the purified plasticizer from the vapor product using a separator device.

Preferably, the contacting device is at least one of a sparger, sintered disc, vapor distributor, in-line mixer, and stripping column. Preferably, the separator device is at least one of a gravity settler, de-entrainment device, and centrifugal separator.

In one embodiment, the vapor product is directed to a gas absorber where volatile impurities are separated from the inert gas, and the inert gas is vented to the atmosphere. In another embodiment, the vapor product is directed to a direct vent to the atmosphere or emissions control device, e.g., a flare stack, absorber bed, or oil trap. In a preferred embodiment where the inert gas is a saturated hydrocarbon, the vapor product comprising volatile impurities and the saturated hydrocarbon are vented to a fuel gas system or a flare system.

In one embodiment, the vapor product is directed to a purge or recovery facility, which may include coolers to condense impurities from the inert gas. In a preferred embodiment, the gas stripping process further comprises, after step (ii): cooling the vapor product comprising volatile impurities and the inert gas to condense and form condensed impurities separated from the inert gas; and collecting and recycling the condensed impurities.

During purification, the plasticizer may be stored in a vessel, such as an intermediate storage vessel, which may be continuously supplied with an inert gas (optionally heated), and preferably operated at a low pressure (e.g., 18 psia (about 1.24 bar), 1 atm absolute) to maximize removal of volatile impurities. The vessel may be optionally equipped with the following: a tray, packing, or other internal means to enhance contact between the inert gas and the plasticizer and create a multi-stage separation; inert gas distributor to distribute the inert gas below the plasticizer liquid level, preferably to generate similarly-sized bubbles; plasticizer distributor to distribute the plasticizer and to enhance liquid-vapor contact and subsequent separation; and devices such as crinkle wire mesh screens to minimize carry-over of liquid droplets into the vent stream.

Generally, preferred inert gases (e.g., stripping agent) are those that are dry, pure, at low cost, and readily available. Examples of inert gases include at least one of nitrogen, a Group 18 element (e.g., argon), a saturated hydrocarbon (e.g., methane, ethane, and hexane), and other non-reactive compounds that exist as gases when being contacted with the plasticizer in step (ii). In yet other embodiments, the stripping agent may comprise one or more light olefins (e.g., ethylene, propylene, and/or butene, etc.).

The plasticizer may be heated at a temperature to reduce its viscosity, increase the vapor pressure of volatile impurities, and/or facilitate subsequent processing of the polymer-plasticizer blend formed downstream. In a preferred embodiment, the temperature in step (i) is below at least one of the bubble point and the decomposition point of the plasticizer. Preferably, the temperature in step (i) is from about 150° C. to about 250° C. The plasticizer may also be heated beyond the temperature required for impurity removal in order to enhance subsequent processing of plasticized polymer (e.g., better mixing, enhanced to devolatization).

In embodiments where the polymer to which the purified plasticizer is being fed to (e.g., the polymer reactor effluent or the polymer-rich phase) after step (b) is at an elevated temperature, it may be advantageous to feed the purified plasticizer to the polymer at the same or similar temperature.

In certain embodiments, it may be preferred to feed the purified plasticizer at a higher temperature than the polymer to which it is fed to after step (b). For example, where the polymer production process includes direct devolatization for solvent removal from the plasticized polymer (e.g., a vacuum devolatizer, wiped-film evaporator, falling strand evaporator, flash vaporization), the heat added to the process by using a hot plasticizer can significantly increase devolatization rates and effectiveness. Such an increase may provide a notable advantage, since the addition of plasticizer to polymer tends to cause product devolatization and finishing to become a polymer production bottleneck.

In one embodiment, the plasticizer is contacted with the inert gas in step (ii) at a pressure of about 0.1 atm to 4 atm absolute, more preferably about 0.1 atm to about 1.5 atm absolute.

The ratio of the mass rate of the inert gas to the mass rate of the plasticizer generally depends on the extent of purification desired and process conditions in step (ii). In one embodiment, the mass rate of the inert gas is about 0.1% to about 20%, preferably about 0.25% to about 5.0%, of the mass rate of the plasticizer.

In one particular embodiment, the process for producing a plasticized polymer using a gas stripping process comprises: continuously supplying the plasticizer at a pressure above atmospheric pressure, generally around ambient temperature or optionally heated to a temperature that facilitates transport (e.g., above plasticizer melting point or below a viscosity limit); heating the plasticizer to a temperature to reduce its viscosity, increase vapor pressure of volatile impurities, and/or facilitate subsequent processing of the polymer-plasticizer blend; providing intermediate storage of the heated plasticizer in a vessel continuously supplied with an inert gas (optionally heated) and preferably at a low pressure to maximize stripping of volatile impurities; continuously directing the vapor product (e.g., vent stream) from the vessel to a suitable purge or recovery facility; and continuously feeding the purified plasticizer to a continuous polymer production process such as those described in U.S. Pat. No. 7,910,637.

In one embodiment, vent stream containing the inert gas (e.g., nitrogen) may be passed through a heat exchanger, using recirculated cooling water as a cooling medium, to form a cooled vent stream. Condensed impurities can be collected and purged. Preferably, the condensed impurities can be recycled or sold (e.g., for fuel value, as a solvent in a non-sensitive process, or to extract valuable components). Where nitrogen is used as the inert gas, the cooled nitrogen, containing a suitably low concentration of impurities, can be vented to the atmosphere. In another embodiment where a light saturated hydrocarbon (e.g., methane) is used as the inert gas, vent stream containing the inert gas may be directly vented to a fuel gas system for energy recovery or flare system.

In one embodiment, cooled vent stream may be bubbled through a low-volatility liquid that is compatible with impurities in that stream. Impurities are absorbed into the liquid and the remaining gas is vented to atmosphere, fuel gas system, or flare system. In another embodiment, cooled vent stream is passed through a fixed bed containing sorbent solids (e.g., activated alumina, molecular sieves, activated carbon) that preferentially capture impurities from the stream.

In one embodiment, vent stream containing the inert gas may be passed through a gas absorber and vented to the atmosphere, fuel gas system or flare system. The liquid in the absorber may be a solvent for the impurities or contain dissolved compounds that react with impurities (e.g., acids or bases). The purified vapors are then vented to the atmosphere, fuel gas system, or flare system. In another embodiment, membranes are used to separate impurities from stripping vapors.

In addition to gas stripping, the polymer production process can further comprise purifying the plasticizer before feeding to the process after step (b) by at least one of: fixed-bed sorption, chemical scavenger, distillation, liquid-liquid extraction, filtration, gravity settling, and centrifugation. In some embodiments, it is advantageous to combine purification methods to remove various impurities, such as filtration to remove solid contaminants, gravity settling to remove a free-water phase, and/or gas stripping to remove volatile impurities.

Fixed-Bed Sorption

In one embodiment, the plasticizer is purified by fixed-bed sorption. This separation technique typically comprises selective transfer of impurities from the plasticizer to the surface of a solid. The capacity of sorbent solids for impurities tends to be low per unit area. Therefore, highly porous solids with large internal surface areas are generally preferred. Sorbents are typically evaluated for compatibility with the plasticizer and selectivity and capacity for key impurities. This is influenced by the concentration of impurities, their polarity and chemical properties, and operating temperature. The chemical structure of a sorbent solid affects its polarity, hydrophilicity, and charge. Sorbent solids are also characterized by their typical pore size and uniformity of pore structure. Zeolite molecular sieves in particular have generally uniform pore size and high affinity for polar molecules, and thus typically exhibit high capacity even at low contaminant concentration. Purification can be enhanced by selecting a pore size that is larger than the effective diameter of impurity molecules but smaller than that of the plasticizer molecules. For example, 3 A molecular sieves are particularly useful in removing water from hydrocarbon streams. 13× molecular sieves are useful in removing larger molecules, including many oxygenates.

Activated aluminas are useful as adsorbents in many applications. These adsorbents have a less uniform pore size distribution and show lower selectivity for polar molecules than zeolite molecular sieves. Specially modified activated aluminas, such as UOP AZ-300, behave like a weak base, enhancing removal of light acid gases, such as $CO_2$, $H_2S$, and COS, via chemisorption. Non-regenerable metal oxide or metal sulfides sorbents can be effective at reducing the concentration of impurities, such as $AsH_3$, $PH_3$, COS, Hg, and $O_2$, to low parts per billion (ppb) levels.

Sorbent solids are generally packed into fixed beds. Bed size is typically determined by the capacity of the solid sorbents for impurities at operating conditions and the acceptable breakthrough time, which is often determined by the time required to regenerate the adsorbent bed. Breakthrough time depends on many factors, including bed operating conditions, bed age and history (conditions during the previous regeneration), and concentrations of the various impurities. An impurity that is physically bound to sorbent solids at the entrance of the fixed bed tends to be displaced by impurities with a higher affinity for the solids. For example, in molecular sieve beds, moisture in a liquid stream tends to displace less polar oxygenated hydrocarbons, causing them to be re-adsorbed closer to the exit of the bed. As a result, oxygenated hydrocarbons tend to break through the bed before water.

Pressure drop may be another consideration for selecting preferred sorption for purification. For fixed beds in laminar flow, pressure drop is directly proportional to liquid viscosity. Plasticizers with relatively high viscosities (e.g., Chevron Paramount 6001 oil: 500 cP at 15° C.) are typically not as well-suited to fixed bed sorption as low molecular hydrocarbon liquids with viscosities less than 1 cP. In some cases, viscosity can be reduced to acceptable levels by heating the plasticizer, but this may reduce the capacity of sorbent solids, reducing effectiveness.

Another consideration for selecting preferred sorption for purification is the ease at which the plasticizer can be removed from the bed prior to regeneration. Relatively viscous liquids with low volatility may be difficult to remove without flushing the bed with a low-viscosity solvent, as bed flushing adds time and complexity and may generate undesirable wastes.

Chemical Scavengers

In one embodiment, the plasticizer is purified by use of chemical scavengers. Scavengers are introduced to feed and diluent streams in many polymerization processes to remove reactive impurities. For example, various aluminum alkyls may be used to scavenge oxygen, moisture, and other nucleophiles. Another example of an oxygen scavenger is hydrazine. A scavenger or scavenger blend is typically added at a molar excess to the impurities that may be present. Because the effectiveness of chemical scavenging is not usually affected much by the relative volatility of impurities in the plasticizer, chemical scavenging can be advantageous when a variety of reactive impurities exist with different volatilities, or when a key impurity has a low relative volatility (<1.2) relative to the plasticizer. The effectiveness of a scavenger may be increased by achieving a generally uniform concentration in the plasticizer via a mixing device, such as a static mixer, mixing tee, or powered mixer. Pre-heating the plasticizer or scavenger may also make scavenging kinetics more favorable and thus more effective. Scavenger use for plasticizer purification can be particularly advantageous in cases in which impurity levels are low (requiring low addition rate of scavenger). Further, investment cost for scavenger addition facilities can be low relative to other purification techniques, particularly if the scavenger is already being used to treat other plant streams.

In view of the reactive nature of scavengers, and that reactions of scavengers and impurities tend to be exothermic, it is preferred that facility design (e.g., scavenger storage and supply facilities) take into consideration resulting potential heat output. It is also preferred that measures are implemented so that free water is removed from or not introduced to the plasticizer, which could lead to an uncontrolled reaction. Other considerations include the byproducts of scavenging reactions, which can include solids and/or metal compounds, and their impact on the plasticized polymer.

Distillation

In one embodiment, the plasticizer is purified by distillation. In general, a relative volatility greater than 1.2 is desired for purification via distillation. In distillation, liquid and vapor flow in a generally countercurrent fashion through a series of vapor-liquid contacting devices (e.g., trays, packing). As vapor moves up the tower, the vapor typically becomes enriched in more volatile components. As liquid moves down the tower, the liquid typically becomes enriched in less volatile components. The number of theoretical stages can be assessed based on the extent of separation desired, and generally correlates to a number of actual trays or heights of packing beds, based on the efficiency (approach to vapor-liquid equilibrium) of the contacting devices.

A distillation system may comprise of a vertical vessel (e.g., tower) containing a liquid-vapor contacting device, a reboiler that partially or fully vaporizes liquid from the bottom of the vessel and directs a portion of the vapors back to the bottom of the tower, and a condenser that partially or fully condenses vapor from the top of vessel and directs a portion of the liquid reflux back to the top of the tower. The plasticizer is fed to the tower, preferably at a location that maximizes impurity removal. Purified plasticizer can be removed as a top, bottom, or sidestream product. Impurities can similarly be removed as a top, bottom, or sidestream product. Preferably, selection of draw-off locations for the separated components, reflux rates, reboiled vapor rates, and operating pressure are adjusted to achieve desired plasticizer purity at low overall (both facilities and operating) cost. For heat-sensitive plasticizers, vacuum distillation may be preferred.

In a preferred embodiment, the distillation method includes use of a stripping tower without a reboiler. In such an embodiment, hot stripping vapor may be fed to the bottom of the tower, and plasticizer (optionally heated) fed to the top. A variety of stripping agents could be considered, including inert gases such as those described for gas stripping. Such a method, optionally with a condenser and reflux, may be effective at removing difficult-to-separate impurities at relatively low stripping vapor rates. In certain embodiments, operation under vacuum may be preferred to allow lower-volatility stripping agents to be used while avoiding excessive tower operating temperatures.

Liquid-Liquid Extraction

In certain embodiments, the plasticizer is purified via liquid-liquid extraction. This method may be preferable where the relative volatility of impurities and the plasticizer is not sufficiently high for gas stripping to be preferable (e.g., <4), not sufficiently different for distillation to be preferable (e.g., between 1.0 and 1.2), or where the plasticizer is highly heat sensitive. In this embodiment, the extraction solvent is preferably immiscible with the plasticizer but compatible with the impurities to be removed. Preferably, transfer of impurities to the extraction solvent is enhanced by incorporating compounds that react or associate with impurities (e.g., acids, bases, complexing agents). The extraction method typically includes at least one of a liquid-liquid contacting tower (e.g., containing packing or plates), an extraction solvent purification tower (e.g., using distillation, sorption, or gas stripping), and a purification tower for the plasticizer (e.g., using distillation, sorption, or gas stripping), particularly if the extraction solvent is an undesirable impurity in the polymer production process.

Filtration, Gravity Settling, Centrifugation

In certain embodiments, the plasticizer is purified by, filtration, gravity settling, and/or centrifugation, preferably to remove solids and/or second liquid phases from the plasticizer. Such methods may be preferred where the plasticizer contains undesirable solids such as polymer gels, particle contamination, packaging material, or a second liquid phase (e.g., free water).

In general, filters contain porous elements that allow liquids to pass through, while entrapping solid particles that are larger than the nominal pore size. Many pore sizes are available that can be matched to the separation requirement. For example, strainers or screens may have mesh openings that are larger than 1 cm$^2$ to catch large contaminants that may plug or damage downstream equipment. Filter elements with pore size of less than 0.01 cm$^2$ can be used to remove visible particles from the plasticized polymer. Similarly with fixed-bed sorption, pressure drop through a filtering device typically increases with increasing plasticizer viscosity. Preheating of the plasticizer to lower viscosity, therefore, may be preferable. Typically, the plasticizer is supplied to the filter at a pressure that is higher than the pressure drop of the filtering device when fouled. Thus, a pressure-increasing device, such as a pump, extruder, or pressurized gas blanket, may be preferable. In certain embodiments continuous filtration may be achieved by providing a spare filter that can be used while cleaning or replacing a filter element. Filter element life can be extended through use of gravity settling of trapped particles (such as in Y-strainers), periodic backwashing, or particulate removal devices such as continuous scrapers.

Gravity settling and centrifugation methods use density differences between the plasticizer and undesirable particles or a second liquid phase to purify the plasticizer. Such methods may be preferred where the density difference with the plasticizer is large, the particle size is large, and/or plasticizer viscosity is low. In some embodiments, heating the plasticizer prior to purification to reduce its viscosity may be preferred. Gravity settling devices are basically vessels that provide residence time for settling to occur. Vessels may be optionally equipped with specialized internals, such as horizontal plates or packing, to enhance coalescence of a second liquid phase. In some embodiments, distributor pipes may be provided to reduce turbulence, and direct feed to one end of a vessel and remove product from the opposite end to increase available residence time for separation. In certain embodiments, centrifugation devices such as cyclones or centrifuges are preferable when density differences are relatively low, plasticizer viscosity is relatively high, and/or the second liquid phase is stabilized as small droplets by surfactants.

Purified Plasticizer

In a preferred embodiment, the purified plasticizer meets at least one of the impurity removal characteristics and/or preferred embodiments listed herein, by concentration (wppm, parts per million by weight) relative to the plasticizer prior to purification (e.g., in step (e) of the process). By "impurity removal characteristics," this means that the purified plasticizer has at least the stated percentage of the reference component removed from, i.e., less than, the plasticizer prior to purification. Such characteristics may include: (1) at least 90%, preferably at least 97%, of oxygen; (2) at least 90%, preferably at least 97%, of water; (3) at least 40% preferably at least 50%, of an impurity having a relative volatility ($\alpha_{ip}$) between $1\times10^5$ and $5\times10^5$; (4) at least 65%, preferably at least 85%, of an impurity having an $\alpha_{ip}$ between $5\times10^5$ and $1\times10^6$; (5) at least 75%, preferably at least 90%, of an impurity having an $\alpha_{ip}$ between $1\times10^6$ and $5\times10^6$; and (6) at least 90%, preferably at least 97%, of an impurity having an $\alpha_{ip}$ greater than $5\times10^6$, is removed. Preferably, the purified plasticizer meets all of the impurity removal characteristics and preferred embodiment listed in (1)-(6).

Relative volatility is described in Perry's Chemical Engineering Handbook, 8$^{th}$ Ed., pp. 13-7 & 13-8 (incorporated by reference herein). Relative volatility $\alpha_{ij}$ describes the relative ease of separating two components I and j in a mixture by distillation. A high value denotes an easier separation. It is typically evaluated at a specified temperature and pressure (here, 200° C. and 1 atm). As used herein, relative volatility $\alpha_{ij}$ is represented by:

$$\alpha_{ij} = \frac{y_i/x_i}{y_j/x_j}$$

where $y_i$ and $x_i$ are the mole fractions of the impurity in the vapor and liquid phases, respectively; $y_j$ and $x_j$ are the mole fractions of the plasticizer in the vapor and liquid phases, respectively; and the vapor and liquid phases are in equilibrium with each other. The $\alpha_{ij}$ value can be obtained from laboratory measurements of vapor and liquid compositions of plasticizer-impurity mixtures at vapor-liquid equilibrium, or through process simulations using a thermodynamic model. As used herein, $\alpha_{ip}$ is the relative volatility of an impurity i to the plasticizer p (thus, p is substituted for j in the relative volatility equation given above in determining $\alpha_{ip}$). A lower reference temperature or higher reference pressure may be used, if the normal boiling point of the plasticizer is below 200° C.

In a preferred embodiment, the purified plasticizer meets at least one of the following impurity removal characteristics, by concentration (wppm) relative to the plasticizer prior to purification (e.g., in step (e) of the process): (7) at least 99% of oxygen; (8) at least 98% of water; (9) at least 65% of an impurity having an $\alpha_{ip}$ between $1\times10^5$ and $5\times10^5$; (10) at least 85% of an impurity having an $\alpha_{ip}$ between $5\times10^5$ and $1\times10^6$; (11) at least 90% of an impurity having an $\alpha_{ip}$ between $1\times10^6$ and $5\times10^6$; and (12) at least 98%0/of an impurity having an $\alpha_{ip}$ greater than $5\times10^6$, is removed. Preferably, the purified plasticizer meets all of the impurity removal characteristics (7)-(12). Impurity concentration in the plasticizer before and after purification may be determined by any suitable means known in the art (e.g., gas chromatography, NMR, and the like), so long as the same measurement method and conditions are used to determine concentrations in the plasticizer both before and after purification. In the event that one measurement method conflicts with another (e.g., a GC measurement conflicts with NMR), concentration measurements obtained using headspace gas chromatography ("headspace GC") should govern.

Plant for Producing Plasticized Polymer

The invention also encompasses a plant for producing a plasticized polymer (e.g., a ethylene-propylene rubber), which in some embodiments comprises: (a) a feed containing olefin monomers in a hydrocarbon solvent; (b) a reactor to which the olefin monomers and a catalyst are supplied to react to form a polymer reactor effluent; (c) a separating means downstream of the reactor to separate the hydrocarbon solvent and Nunreacted olefin monomer from the polymer reactor effluent, which separating means includes a separator (e.g., a high-pressure separator) to separate the polymer reactor effluent into a polymer-rich phase and a polymer-lean phase; (d) a recycling means for recycling polymer-lean phase back to the reactor; and (e) a plasticizer supply means for supplying a plasticizer downstream of the reactor. In some embodiments, the plasticizer supply means comprises (i) a pressure source, (ii) a heater, (iii) a vessel in which an inert gas is added to a plasticizer, (iv) a contacting device to contact the plasticizer with the inert gas, (v) a separator device to separate the vapor product from the purified plasticizer, and (vi) a feeding means for feeding the purified plasticizer downstream of the reactor.

Details of exemplary polymer production processes and plants suitable for use with the present invention can be found in U.S. Pat. No. 6,881,800, incorporated by reference in its entirety. This reference provides processes and plants for continuous solution polymerization, which include a pressure source, a polymerization reactor downstream of said pressure source, pressure let-down device downstream of said polymerization reactor, and a separator downstream of said pressure let-down device, wherein said pressure source is sufficient to provide pressure to said reaction mixture during operation of said process plant to produce a single-phase liquid reaction mixture in said reactor and a two-phase liquid-liquid reaction mixture in said separator in the absence of an additional pressure source between said reactor and said separator. In one example, the reference describes a plant for continuous solution polymerization of a feed of olefinically unsaturated monomer in a hydrocarbon solvent under pressure, having a continuous stirred tank reactor arrangement, with inlets for feed and for a single-sited catalyst component, to form a polymer-containing polymerization reaction mixture (i.e., polymer-monomer mixture); and downstream thereof separating means for continuous separation of the solvent and unreacted monomer from the mixture, which separating means include at least an initial liquid phase separator to separate the polymerization mixture into a lean phase for passing through a recycle back to the reactor arrangement and a concentrated phase, a conduit being provided for passing the lean phase in liquid form to a stripping arrangement for removing hydrogen added to or generated during polymerization, which stripping arrangement comprises a means for contacting a stripping for with the lean phase in a countercurrent flow arrangement to concentrate the hydrogen in the vapor phase for removal from the lean phase recycle. In one embodiment, the purified plasticizer can be added downstream of the polymer-monomer mixture to form a plasticized polymer blend stream according to the invention.

In other examples, this reference describes a continuous solution polymerization process of a feed of olefinically unsaturated monomer in a hydrocarbon solvent under pressure, which plant contains a continuous stirred tank reactor arrangement to which a single-site catalyst may be supplied to form a polymer containing polymerization reaction mixture (i.e., polymer-monomer mixture), optionally in the presence of a solvent, and downstream of the reactor arrangement separating means for continuous separation of the solvent and unreacted monomer from the mixture, which separating means include at least an initial liquid phase separator to separate the polymerization mixture into a concentrated phase (i.e., polymer-rich phase) and a polymer lean phase. A high capacity, low viscosity pump is to arranged for raising the pressure of the feed to at least 75 bar, and a heating arrangement is provided to cause the mixture to pass from the reactor arrangement through the heating arrangement up to a pressure reducing means upstream of the liquid phase separator, with or without additional pumping means being provided between the reactor and the pressure reducing means. Certain means may be provided for introducing a catalyst killer downstream of reactor arrangement and upstream of the liquid phase separator to prevent further polymerization in the separator of the heated polymerization mixture undergoing separation, for cooling the lean phase, and/or for conveying a recycled stream back to the inlet side of the pump. In one embodiment, the purified plasticizer can be added downstream of the polymer-monomer mixture to form a plasticized polymer blend stream according to the invention.

Exemplary polymer production processes and plants suitable for use with the present invention can also be found in U.S. Pat. No. 7,163,989, incorporated by reference in its entirety. This reference provides processes and plants for continuous solution polymerization, which include: (A) forming a feed comprising one or more olefinically unsaturated monomers and a hydrocarbon solvent; (B) raising the pressure of the feed to at least 75 bar; (C) passing the feed into a reaction zone, and contacting the feed with a single-site catalyst to form a polymerization mixture (i.e., polymer-monomer mixture); (D) adding a catalyst killer to the polymerization mixture; (E) subsequent to step (D), heating the polymerization mixture and subsequently reducing the pressure of the polymerization mixture, wherein upon said pressure reduction, the polymerization mixture passes through the lower critical solution phase boundary regardless of the initial polymerization pressure; (F) separating the polymerization mixture into a lean phase and a concentrated phase; (G) recycling at least a portion of the lean phase to step (A); (H) cooling the lean phase; and (I) drying the lean phase. In one embodiment, the purified plasticizer can be added to the polymer-monomer mixture after step (C) of the process described in this reference to form a plasticized polymer blend stream according to the invention.

In-Line Blending

In a preferred embodiment, the purified plasticizer is added to the polymer production process via in-line blending of the plasticizer with the polymer, before recovery and pelletizing of solid polymer blend components.

As used herein, to "blend" or a "blend" of polymer with a plasticizer refers generally to the combination of the two components, and is not limited by any particular means or characteristics of the resulting combination. For example, with EPDM polymer and a plasticizer such as mineral oil, the resulting blend may be an oil-extended polymer. In some embodiments, the polymer and plasticizer may form a homogeneous blend of miscible components, with little or no chemical reaction between these components.

Exemplary details of in-line blending are disclosed in U.S. Pat. No. 7,910,637, incorporated by reference in its entirely. For example, this reference describes an in-line blending process for plasticized polymers comprising: (A) providing a single reactor train including one reactor or two or more serially configured reactors, a high-pressure separator downstream fluidly connected to the reactor train, and one or more storage tanks, wherein the reactor train produces one or more polymers and the one or more storage tanks store one or more off-line-produced plasticizers; (B) contacting in the reactors of the reactor train olefin monomers having two or more carbon atoms, one or more catalyst systems, optional one or more comonomers, optional one or more scavengers, and optional one or more diluents or solvents, wherein the reactor train is at a temperature above the solid-fluid phase transition temperature of the polymerization system and a pressure no lower than 10 MPa below the cloud point pressure of the polymerization system and less than 1500 MPa, (C) forming a polymer reactor effluent including a homogeneous fluid phase polymer-monomer mixture in the reactor train; (D) passing the polymer reactor effluent comprising the homogeneous fluid phase polymer-monomer mixture from the reactor train through the high-pressure separator; (E) maintaining the temperature and pressure within the high-pressure separator above the solid-fluid phase transition point but below the cloud point pressure and temperature to form a fluid-fluid two-phase system comprising a polymer-rich phase and a polymer-lean phase; (F) separating the polymer-lean phase from the polymer-rich phase in the high-pressure separator to form an enriched polymer phase and a separated polymer-lean phase; and (G) feeding the one or more off-line produced plasticizers from the one or more storage tanks to the process after (C) to form a plasticized polymer blend stream.

In certain embodiments of the present invention, off-line or on-line produced plasticizer can be purified by at least one of: gas stripping, fixed-bed sorption, chemical scavenger, distillation, liquid-liquid extraction, filtration, gravity settling, and centrifugation to produce a purified plasticizer. The purified plasticizer can then be fed to the process described above after (C) to form a plasticized polymer blend stream according to the present invention.

The purified plasticizer can be fed in liquid, molten, or dissolved state to the polymer-containing effluent stream to produce the plasticized polymer blend. The blending point for combining the polymer- and plasticizer-containing streams may be anywhere downstream of the single reactor train. Advantageously, the purified plasticizer is blended with a polymer-containing stream that still contains at least some of the low molecular weight components, such as the monomers and the optional inert solvents/diluents of the polymerization system, to facilitate the blending process by the virtue of reduced viscosity. The said advantageous mixing points of the disclosed in-line blending processes may exist downstream of the reactor (or reactors of a series configuration), and upstream of the extruder or devolatizing extruder of the product finishing section, particularly, downstream of the reactor and upstream of or in the low-pressure separator deployed just before the said extruder or devolatizing extruder of the finishing section. This aspect of the disclosed processes blends the purified plasticizer and the polymer in-line, i.e., before the polymer is recovered in its essentially pure, solid form.

In one aspect, the polymer effluent stream (i.e., polymer reactor effluent) from the single reactor train and the purified plasticizer may be combined downstream of the reactor train and upstream of or in a phase separator that simultaneously provides blending of the in-line blend components and separation of monomer and inert diluent or solvent from the polymer blend components and plasticizer blend components. The phase separator may bring the polymer effluent and purified plasticizer below the cloud point of the mixture, while maintaining said mixed stream above the solid-fluid phase transition point by adjusting the temperature and pressure of the polymer and purified plasticizer individually (i.e., before the mixing point), or combined (i.e., after the mixing point).

In certain embodiments, the polymer and purified plasticizer may be combined upstream of a phase separator, optionally passing the mixed stream through one or more static mixers before entering the said separator to enhance mixing. The pressure within the separator vessel may be maintained below the cloud point pressure to form two fluid phases comprising a polymer-plasticizer-rich fluid phase, and a monomer-rich fluid phase. The temperature in the separator may be maintained above the solid-fluid phase transition temperature to allow the formation and settling to the bottom of a continuous layer a denser well-mixed fluid polymer-plasticizer-rich blend phase, and the formation and rising to the top of a continuous layer of a lower-density monomer-solvent-rich (polymer-lean) phase. The monomer-rich phase may be separated from a polymer-plasticizer-rich blend phase, and the separated monomer-rich/polymer-lean phase recycled directly or after further treatment to the polymerization train. Optionally, the pressure of the first polymer-plasticizer-rich blend phase upstream of or in a low-pressure separator may be reduced to achieve another fluid-fluid separation into a more concentrated polymer-plasticizer-rich fluid phase, and another monomer-rich/polymer-lean phase. The temperature here may be maintained above the solid-fluid phase transition temperature by optionally further heating the first polyolefin-plasticizer rich blend stream.

In certain embodiments, a catalyst killer, polymer modifier, and/or additive in their dense fluid state (e.g., liquid, supercritical fluid, molten, or dissolved state) may be added to the polymer- and/or plasticizer-containing effluent stream. This can be done at any desired point downstream of the first pressure letdown valves in any of the individual or combined effluent streams of the reactor trains in the reactor bank of the disclosed processes. The polymer-plasticizer-rich phase from the separator section of the in-line blending process can then be conveyed to a downstream finishing stage for further monomer stripping, drying and/or pelletizing to form the plasticized polymer blend product of the in-line blending process.

Plasticizer

Plasticizers suitable for use in the invention may be produced off-line or on-line. Preferably, the plasticizer is produced off-line. As used herein in accordance with the invention, a plasticizer is intended to be distinguished from a solvent in the polymer production process in the sense that the plasticizer is intended to largely remain in the final polymer product, whereas the solvent is typically removed therefrom. Preferably, the polymer produced contains at least 5 phr of the plasticizer, more preferably at least 10 phr, or phr, or 50 phr of the plasticizer.

Plasticizers are defined as per J. K. Sears, J. R. Darby, The Technology of Plasticizers, Wiley, New, York, 1982, stating that "[p]lasticizer is a material incorporated in a plastic to increase its workability and its flexibility or distensibility (elongation). Addition of the plasticizer may lower the melt viscosity, temperature of the second-order transition, or the elastic modulus of the plastic." The "plastic" referenced herein can be applied more broadly to polymers in general (e.g., polyolefins, rubber).

The Sears-Darby monograph also stipulates that "[o]rganic plasticizers are usually moderately high molecular weight liquids or occasionally low-melting solids." Consequently, plasticizers typically have a Mw of 30 kg/mol or less, or 20 kg/mol or less, or kg/mol or less, or 5 kg/mol or less. Examples of plasticizers suitable for blending with polymers, such as polyolefins include oligomers of olefins, paraffin oils and waxes, mineral oils, synthetic oils, bio-derived oils, lubricant base stocks, low molecular weight elastomers or plastomers, etc., and mixtures thereof. Details on exemplary plasticizers suitable for use in the invention can be found in U.S. Pat. No. 7,910,637, incorporated by reference herein in its entirety.

Plasticizers generally have a lower glass transition temperature and/or lower modulus and/or lower crystallinity and/or lower Mw than the polymer in the polymer production process. Suitable plasticizers may include, for example, oligomers, polymers, and copolymers of $C_5$ to $C_{20}$ alpha olefins and mixtures thereof (also called poly(alpha-olefin)s or PAOs), oligomers and copolymers of ethylene and propylene, oligomers and copolymers of ethylene and $C_4$-$C_{20}$ olefins, oligomers and copolymers of propylene and $C_4$-$C_{20}$ olefins, paraffin oils and waxes, mineral oils, synthetic oils, synthetic and mineral lube base stocks, elastomers, and plastomers, A polyolefin plasticizer is an olefin polymer having a Mw of 30 kg/mol or less, and may have any heat of fusion ($H_f$) as measured between the temperatures of 21 and 230° C. by DSC second melt. Examples of polyolefin plasticizers include oligomers, polymers, and copolymers of $C_2$ to $C_{20}$ alpha olefins, oligomers and copolymers of ethylene and $C_3$ to $C_{20}$ olefins, oligomers and copolymers of propylene and $C_4$ to $C_{20}$ olefins, and mixtures thereof.

A polyalphaolefin (PAO) is a polyolefin plasticizer manufactured by catalytic polymerization of higher alpha-olefins (i.e., alpha-olefins having 4 or more carbons). Preferably, the higher alpha-olefins are linear alpha-olefins having 5 to 20 carbon atoms. The PAO may be characterized by any degree of tacticity, including isotacticity or syndiotacticity, and/or may be atactic, and may have more than 50% meso dyads or more than 50% racemic diads as measured by $^{13}C$-NMR.

Preferred plasticizers for in-line blending with polymer are generally capable of being codissolved with the polymer in the separator, and have a glass transition temperature (Tg) of −2° C. or less and at least one of the following: a Mw of 10 kg/mol or less, or a flexural modulus of 20 MPa or less. Non-limiting exemplary plasticizers conducive to in-line blending include paraffin oils and waxes (e.g., isoparaffins or n-paraffins), mineral oils, vegetable or other bio-derived oils, and other synthetic or natural oils such as described in SYNTHETICS, MINERAL OILS, AND BIO-BASED LUBRICANTS: CHEMISTRY AND TECHNOLOGY, L. S. Rudnick, Ed., CRC Press, 2006. Particularly, preferred plasticizers include isoparaffins, process oils, high purity hydrocarbon fluids derived from a so-called Gas-To-Liquids processes, and Group III lubricant basestocks.

Preferred plasticizer for in-line blending may comprise, or may consist essentially of, one or more $C_6$ to $C_{200}$ paraffins. In one embodiment, the paraffin plasticizer may comprise $C_6$ to $C_{100}$ paraffins or $C_8$ to $C_{100}$ paraffins. In yet another embodiment, the paraffin plasticizer may comprise $C_{20}$ to $C_{100}$ paraffins, or $C_{20}$ to $C_{500}$ paraffins, or $C_{30}$ to $C_{400}$ paraffins, or $C_{40}$ to $C_{250}$ paraffins.

In another embodiment, a paraffin plasticizer may comprise, or may consist essentially of, one or more linear or normal paraffins (n-paraffins). Advantageous paraffin plasticizers comprise at least 50 wt %, or at least 60 wt %, or at least 70 wt %, or at least 80 wt %, or at least 90 wt %, or at least 95 wt %, or essentially 100 wt %, of $C_5$ to $C_{25}$ n-paraffins, or $C_5$ to $C_{20}$ n-paraffins, or $C_5$ to $C_{15}$ n-paraffins. Advantageous n-paraffins may also comprise less than 0.1 wt %, or less than 0.01 wt % aromatics. In another embodiment, a paraffin plasticizer may comprise, or may consist essentially of, one or more branched paraffins (isoparaffins). Advantageous paraffin plasticizers comprise at least 50 wt %, or at least 60 wt %, or at least 70 wt %, or at least 80 wt %, or at least 90 wt %, or at least 95 wt %, or essentially 100 wt %, of $C_6$ to $C_{150}$ isoparaffins. The paraffin plasticizer may also comprise $C_6$ to $C_{100}$ isoparaffins, or $C_6$ to $C_{25}$ isoparaffins, or $C_8$ to $C_{20}$ isoparaffins. Advantageous isoparaffins may have: a density of 0.70 to 0.83 g/mL; and/or a pour point of −40° C. or less, or −50° C. or less; and/or a viscosity at 25° C. of 0.5 to 20 cSt; and/or a weight-averaged molecular weight (Mw) of 100 to 300 g/mol. The isoparaffins may include greater than 50 wt % (by total weight of the isoparaffin) mono-methyl species, for example, 2-methyl, 3-methyl, 4-methyl, 5-methyl or the like, with minimum formation of branches with substituent groups of carbon number greater than 1 (e.g., ethyl, propyl, butyl and the like). In one embodiment, the isoparaffin includes greater than 70 wt % mono-methyl species, based on the total weight of the isoparaffin present. Advantageously, the isoparaffin has a boiling point of from 100° C. to 350° C., or 110° C. to 320° C., and preferably about 200° C. to 320° C. In preparing different grades of isoparaffin, a paraffinic mixture may be fractionated into cuts having narrow boiling ranges, for example, of about 35° C.

In a preferred embodiment, the plasticizer is a mineral oil. The term mineral oil includes any fluid derived from petroleum crude oil that has been subjected to refining (such as distillation, solvent processing, hydroprocessing, and/or dewaxing). This also includes petroleum-based oils that are extensively purified and/or modified through processing treatments. It excludes synthetic oils, which have been manufactured by combining monomer units using catalysts and/or heat. In the polymer processing art, mineral oils are often called process oils, extender oils, white oils, technical oils, or food grade oils. Such fluids typically have a viscosity index less than 120, most have a viscosity index less than 110, and many have a viscosity index of 100 or less.

The American Petroleum Institute categorizes mineral oils as Group I, II, or III basestocks based upon saturates content, sulfur content, and Viscosity Index (VI) (as measured following ASTM D2007. ASTM D2622, and ASTM D2270, respectively). Even in cases where a mineral oil is not identified by an API Group classification, it is still possible, for purposes of this invention, to define two classes of mineral oils based on Viscosity Index: Group I/II mineral oils, which have VI less than 120; and Group III mineral oils, which have VI of 120 or more. In a preferred embodiment, the plasticizer is a Group I or Group II paraffinic oil.

Characteristics of some commercially available mineral oils used as process oils are listed in the table below. Such fluids typically have a viscosity index less than 110, and many have a viscosity index of 100 or less. Advantageously, the mineral oil plasticizer has a kinematic viscosity at 40° C. of 80 cSt or more and a pour point of −15° C.

| | KV @ 40° C. cSt | KV @ 100° C. cSt | VI | Pour Point ° C. | Specific gravity | Flash Point ° C. |
|---|---|---|---|---|---|---|
| Drakeol 34 [1] | 76 | 9 | 99 | −12 | 0.872 | 254 |
| Paralux 1001R [2] | 20 | 4 | 99 | −17 | 0.849 | 212 |
| Paralux 2401R [2] | 43 | 6 | 101 | −12 | 0.866 | 234 |
| Paralux 6001R [2] | 118 | 12 | 102 | −21 | 0.875 | 274 |
| Sunpar 120 [3] | 41 | 6 | 106 | −15 | 0.872 | 228 |
| Sunpar 150 [3] | 94 | 11 | 97 | −12 | 0.881 | 245 |
| Sunpar 2280 [3] | 475 | 31 | 95 | −9 | 0.899 | 305 |
| Plastol 135 [4] | 24 | 5 | 104 | −9 | 0.865 | 210 |
| Plastol 537 [4] | 103 | 11 | 97 | −3 | 0.880 | 240 |
| Plastol 2105 [4] | 380 | 30 | 110 | −15 | 0.885 | 270 |
| Flexon 843 [4] | 30 | 5 | 91 | −12 | 0.869 | 218 |
| Flexon 865 [4] | 106 | 11 | 93 | −3 | 0.879 | 252 |
| Flexon 815 [4] | 457 | 32 | 101 | −9 | 0.895 | 310 |
| Shellflex 210 [5] | 19 | 4 | 95 | −18 | 0.860 | 216 |
| Shellflex 330 [5] | 70 | 9 | 95 | −10 | 0.875 | 256 |
| Shellflex 810 [5] | 501 | 33 | 95 | −9 | 0.896 | 324 |
| Diana PW32 [6] | 31 | 5 | 104 | −18 | 0.862 | 226 |
| Diana PW90 [6] | 90 | 11 | 105 | −22 | 0.872 | 262 |
| Diana PW380 [6] | 376 | 26 | 106 | −19 | 0.877 | 293 |

[1] Available from Penreco (USA).
[2] Available from Chevron (USA).
[3] Available from Sunoco (USA).
[4] Available from ExxonMobil (USA).
[5] Available from Royal Dutch Shell (UK/Netherlands).
[6] Available from Idemitsu (Japan).

In certain embodiments, the mineral oil has a viscosity index less than 120 (preferably 90 to 119); and a kinematic viscosity at 40° C. of 80 cSt or more (preferably 90 cSt 1 to or more, or 100 cSt or more, or 120 cSt or more, or 150 cSt or more, or 200 cSt or more, or 250 cSt or more, or 300 cSt or more); and a pour point of 15° C. or less (preferably 18° C. or less, or 20° C. or less, or 25° C. or less, or 30° C. or less, or 35° C. or less).

In other embodiments, the mineral oil comprises one or more Group I or II lubricant basestocks. Group I basestocks are mineral oils that may have been refined using solvent extraction of aromatics, solvent dewaxing, and hydrofining; they may have sulfur levels greater than 0.03 wt %, saturates levels of 60 to 80%, and a VI of about 90. Group II basestocks are mineral oils that have been mildly hydrocracked with conventional solvent extraction of aromatics, solvent dewaxing, and more severe hydrofining to reduce sulfur levels to less than or equal to 0.03 wt %, as well as removing double bonds from some of the olefinic and aromatic compounds such that saturate levels are greater than 95-98%; they have a VI of about 80-120.

Catalyst

The term "catalyst system" means a catalyst precursor/activator pair. When "catalyst system" is used to describe such a pair before activation, it means the unactivated catalyst (pre-catalyst) together with an activator and, optionally, a co-activator. When it is used to describe such a pair after activation, it means the activated catalyst and the activator or other charge-balancing moiety. The transition metal compound may be neutral as in a pre-catalyst, or a charged species with a counter ion as in an activated catalyst system. The term "catalyst system" can also include more than one catalyst precursor and/or more than one activator and optionally a co-activator. Likewise, the term "catalyst system" can also include more than one activated catalyst and one or more activator or other charge-balancing moiety, and optionally a co-activator.

Catalyst precursor is also often referred to as pre-catalyst, catalyst, catalyst compound, transition (or lanthanide or actinide) metal compound or transition (or lanthanide or actinide) metal complex. These words are used interchangeably. Activator and co-catalyst (or co-catalyst) are also used interchangeably. A scavenger is a compound that is typically added to facilitate polymerization by scavenging impurities. Some scavengers may also act as activators and may be referred to as co-activators. A co-activator that is not a scavenger may also be used in conjunction with an activator in order to form an active catalyst. In some embodiments, a co-activator can be pre-mixed with the transition metal compound to form an alkylated transition metal compound.

An activator or co-catalyst is a compound or mixture of compounds capable of activating a pre-catalyst to form an activated catalyst. The activator can be a neutral compound (also called a neutral activator) such as tris-perfluorphenyl boron or tris-perfluorophenyl aluminum, or an ionic compound (also called a discrete ionic activator) such as dimethylanilinium tetrakis-perfluorophenyl borate or triphenylcarbonium tetrakis-perfluoronaphthyl borate. Activators of these types are also commonly referred to as non-coordinating anion activators (NCA activators) owing to the commonly held belief by those skilled in the art, that the reaction of the activator with the pre-catalyst forms a cationic metal complex and an anionic non-coordinating or weekly coordinating anion (NCA). Activators of these types that are discrete characterizable compounds by definition exclude alumoxane co-catalysts which are mixtures. The use of the term NCA is used as an adjective to describe the type of activator as in an NCA activator, or is used as a noun to describe the non-coordinating or weakly coordinating anion which is derived from the NCA activator.

The processes described herein may use any catalyst system capable of polymerizing the monomers disclosed herein if that catalyst system is sufficiently active under the polymerization conditions disclosed herein. Thus, group 3-10 transition metal compounds or lanthanide metal compounds or actinide metal compounds may form suitable catalysts. A suitable olefin polymerization catalyst should be able to coordinate to, or otherwise associate with, an alkenyl unsaturation. Exemplary, but not limiting, catalysts include catalyst systems based on Ziegler-Natta catalyst compounds, metallocene catalyst compounds, late transition metal catalyst compounds, and other non-metallocene catalyst compounds. In some embodiments, the catalyst compound is a metallocene catalyst compound, and the plasticized polymer is preferably an ethylene-propylene-diene rubber, preferably blended with mineral oil.

As disclosed herein, Ziegler-Natta catalysts are those referred to as first, second, third, fourth, and fifth generation catalysts in the PROPYLENE HANDBOOK, E. P. Moore, Jr., Ed., Hanser, New York, 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the group 4, 5, 6, the lanthanide series, or the actinide series of the Periodic Table of the Elements). Non-metallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52). WO 03/040442 (pages 21 to 54), WO 2006/38628, and U.S. patent application Ser. No. 11/714,546, each of which is herein incorporated by reference.

Catalysts suitable for the polymer production process may generally contain a transition metal of groups 3 to 10 of the Periodic Table or a lanthanide or actinide metal, and at least one ancillary ligand that remains bonded to the transition metal during polymerization. The catalyst should preferably be selected from among a broad range of available catalysts known in the art to suit the type of polymer being made and the process window associated therewith in such a way that the polymer is produced under the process conditions at an activity of at least 40,000 g polymer per gram of the pre-catalyst (such as a metallocene pre-catalyst), preferably at least 60,000 or even in excess of 100,000 g polymer per g or the pre-catalyst.

Preferably, the catalyst is used in a cationic state and stabilized by a co-catalyst or activator. Especially preferred are group 4 metallocenes of (i.e., titanium, hafnium or zirconium) which typically exist during the polymerization in the $d^0$ mono-valent cationic state and bear one or two ancillary ligands. The important features of such catalysts for coordination polymerization is that the pre-catalyst comprises a ligand capable of abstraction and another ligand into which ethylene (or other olefin) can be inserted.

Representative metallocene-type compounds can have the formula:

$$T_j L^A{}_L L^B L^C{}_i MDE$$

where, M is a group 3, 4, 5, or 6 transition metal atom, or a lanthanide metal atom, or actinide metal atom, preferably a group 4 transition metal atom selected from titanium, zirconium or hafnium; $L^A$, an ancillary ligand, is a substituted or unsubstituted monocyclic or polycyclic arenyl pi-bonded to M; $L^B$ is a member of the class of ancillary ligands defined for $L^A$, or is J, a hetero-atom ancillary ligand bonded to M through the heteroatom; the $L^A$ and $L^B$ ligands may be covalently bridged together through a bridging group, T, containing a group 14, 15 or 16 element or boron wherein j is 1 if T is present and j is 0 if T is absent (j equals 0 or 1); $L^C{}_i$ is an optional neutral, non-oxidizing ligand having a dative bond to M (i equals 0, 1, 2 or 3); and, D and E are independently mono-anionic labile ligands, each having a sigma-bond to M, optionally bridged to each other or to $L^A$, $L^B$ or $L^C$.

As used herein, the term "monocyclic arenyl ligand" is used herein to mean a substituted or unsubstituted monoanionic $C_5$ to $C_{100}$ hydrocarbyl ligand that contains an aromatic five-membered single hydrocarbyl ring structure (also referred to as a cyclopentadienyl ring).

As used herein, the term "polycyclic arenyl ligand" is used herein to mean a substituted or unsubstituted monoanionic $C_8$ to $C_{103}$ hydrocarbyl ligand that contains an aromatic five-membered hydrocarbyl ring (also referred to as a cyclopentadienyl ring) that is fused to one or two partially unsaturated, or aromatic hydrocarbyl or heteroatom substituted hydrocarbyl ring structures which may be fused to additional saturated, partially unsaturated, or aromatic hydrocarbyl or heteroatom substituted hydrocarbyl rings.

Cyclopentadienyl ligands, indenyl ligands fluorenyl ligands, tetrahydroindenyl ligands, cyclopenta[b]thienyl ligands, and cyclopenta[b]pyridyl ligands are all examples of arenyl ligands.

Non-limiting examples of $L^A$ include substituted or unsubstituted cyclopentadienyl ligands, indenyl ligands, fluorenyl ligands, dibenzo[b,h]fluorenyl ligands, benzo[b]fluorenyl ligands, azulenyl ligands, pentalenyl ligands, cyclopenta[b]naphthyl ligands, cyclopenta[a]naphthyl ligands, cyclopenta[b]thienyl ligands, cyclopenta[c]thienyl ligands, cyclopenta[b]pyrrolyl ligands, cyclopenta[c]pyrrolyl ligands, cyclopenta[b]furyl ligands, cyclopenta[c]furyl ligands, cyclopenta[b]phospholyl ligands, cyclopenta[c]phospholyl ligands, cyclopenta[b]pyridyl ligands, cyclopenta[c]pyridyl ligands, cyclopenta[c]phosphinyl ligands, cyclopenta[b]phosphinyl ligands, cyclopenta[g]quinolyl, cyclopenta[g]isoquinolyl, indeno[1,2-c]pyridyl, and the like, including hydrogenated versions thereof, for example tetrahydroindenyl ligands.

Non-limiting examples of $L^B$ include those listed for $L^A$ above. Additionally $L^B$ is defined as J, wherein J is represented by the formula J'-R"$_{k\text{-}l\text{-}j}$  and J' is bonded to M. J' is a heteroatom with a coordination number of three from group 15 or with a coordination number of two from group 16 of the Periodic Table of Elements, and is preferably nitrogen; R" is selected from $C_1$-$C_{100}$ substituted or unsubstituted hydrocarbyl radical; k is the coordination number of the heteroatom J' where "k-l-j" indicates the number of R" substituents bonded to J'. Non-limiting examples of J include all isomers (including cyclics) of propylamido, butylamido, pentylamido, hexylamido, heptylamido, octylamido, nonylamido, decylamido, undecylamido, docecylamido, phenylamido, tolylamido, xylylamido, benzylamido, biphenylamido, oxo, sulfandiyl, hexylphosphido and the like.

When present, T is a bridging group containing boron or a group 14, 15 or 16 element. Examples of suitable bridging groups include R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'$_2$CSiR'$_2$, R'$_2$SiSiR'$_2$, R'$_2$CSiR'$_2$CR'$_2$, R'$_2$SiCR'$_2$SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'B, R'$_2$C—BR', R'$_2$C—BR'—CR'$_2$, R'$_2$C—O—CR'$_2$, R'$_2$C—S—CR'$_2$, R'$_2$C—Se—CR'$_2$, R'$_2$C—NR'—CR'$_2$, and R'$_2$C—PR'—CR'$_2$ where R' is hydrogen or a $C_1$-$C_{20}$ containing hydrocarbyl or substituted hydrocarbyl and optionally two or more adjacent R' may join to form a substituted or unsubstituted, saturated, partially unsaturated or aromatic, cyclic or polycyclic substituent.

Non-limiting examples of the bridging group T include $CH_2$, $CH_2CH_2$, $CMe_2$, $SiMe_2$, $SiEt_2$, $SiPh_2$, $SiMePh$, $Si(CH_2)_3$, $Si(CH_2)_4$, $Si(CH_2)_5$, $Si(Ph\text{-}p\text{-}SiEt_3)_2$, and the like.

Non-limiting examples of D and E are independently, fluoro, chloro, bromo, iodo, methyl, ethyl, benzyl, dimethylamido, methoxy, and the like.

More preferred are metallocenes which are bis-cyclopentadienyl derivatives of a group 4 transition metal, preferably zirconium or hafnium. See WO9941294. These may advantageously be derivatives containing a fluorenyl ligand and a cyclopentadienyl ligand connected by a single carbon and silicon atom. See WO9945040 and WO9945041. Most preferably, the Cp ring is unsubstituted and/or the bridge contains alkyl substituents, suitably alkvlsilvl substituents to assist in the alkane solubility of the metallocene. See WO0/24792 and WO00/24793. Other possible metallocenes include those in WO01/58912. Other suitable metallocenes may be bis-fluorenyl derivatives or unbridged indenyl derivatives which may be substituted at one or more positions on the fused ruing with moieties which have the effect of increasing the molecular weight and so indirectly permit polymerization at higher temperatures, such as described in EP693506 and EP780395.

Representative non-metallocene transition metal compounds usable as catalysts also include tetrabenzyl zirconium, tetra-bis(trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris(trimethylsilylmethyl) tantalum dichloride.

Additional non-metallocene transition metal compounds usable as catalysts are described in U.S. Pat. Nos. 7,973,116, 8,394,902, 8,674,040, and 8,710,163. US2014-0221587, US2014-0256893, U.S. Ser. No. 61/815,065, and U.S. Ser. No. 14/258,121, and are incorporated by reference. Also, useful catalysts are described in US2014-0039138, US2014-0039139, US2014-0039140, US2014-0039137, US2014-0128557, US2014-0275454, and U.S. Ser. No. 61/915,924, and are incorporated by reference.

The pre-catalyst can be used with a co-catalyst which may be alumoxane preferably methylalumoxane having an average degree of oligomerization of from 4 to 30 as determined by vapor pressure osmometry. Alumoxane may be modified to provide solubility in linear alkanes or be used in a slurry but is generally used from a toluene solution. Such solutions may include unreacted trialkyl aluminum where the alumoxane concentration is generally indicated as mol Al per liter, which concentration includes any trialkyl aluminum which has not reacted to form an oligomer. The alumoxane, when used as co-catalyst, is generally used in molar excess, at a mole ratio of 50 or more, preferably 100 or more, and preferably 1000 or less, preferably 500 or less, relative to the transition metal.

The metallocene may also be used with a co-catalyst which is a non- or weakly-coordinating anion. The term non-coordinating anion (NCA) as used herein includes weakly-coordinated anions. The coordination should be sufficiently weak in any event, as evidenced by the progress of polymerization, to permit the insertion of the unsaturated monomer component. The non-coordinating anion may be supplied and reacted with the metallocene in any of the manners described in the art.

NCA activators (at times used in combination with a co-activator) may be used in the practice of this invention. Preferably, discrete ionic activators such as [Me$_2$PhNH][B (C$_6$F$_5$)$_4$], [Ph$_3$C][B(C$_6$F$_5$)$_4$], [Me$_2$PhNH][B((C$_6$H$_3$-3,5-(CF$_3$)$_2$))$_4$], [Ph$_3$C][B((C$_6$H$_3$-3,5-(CF$_3$)$_2$))$_4$], [NH$_4$][B(C$_6$H$_5$)$_4$], [Me$_2$PhNH][B(C$_{10}$F$_7$)$_4$], [Ph$_3$C][B(C$_{10}$F$_7$)$_4$], or neutral activators such as B(C$_6$F$_5$)$_3$, B(C$_{10}$F$_7$)$_3$ or B(C$_6$H$_5$)$_3$ can be used (where C$_6$F$_5$ is prefluorophenyl, C$_{10}$F$_7$ is perfluoronaphthyl, C$_6$H$_3$-3,5-(CF$_3$)$_2$ is 3.5-bis(trifluoromethyl) phenyl). Preferred co-activators, when used, are alumoxanes such as methyl alumoxane, modified alumoxanes such as modified methyl alumoxane, and aluminum alkyls such as tri-isobutyl aluminum, and trimethyl aluminum.

It is within the scope of this invention to use one or more types of NCA activators, which may be neutral or ionic, such as tri (n-butyl) ammonium tetrakis (pentafluorophenyl) borate, a trisperfluorophenyl boron metalloid precursor or a trisperfluoronaphthyl boron metalloid precursor, polyhalogenated heteroborane anions (WO 98/43983), boric acid (U.S. Pat. No. 5,942,459).

Activated ionic catalysts can be prepared by reacting a transition metal compound (pre-catalyst) with a neutral activator, such as B(C$_6$F$_6$)$_3$, which upon reaction with the hydrolyzable ligand (X) of the transition metal compound forms an anion, such as ([B(C$_6$F$_5$)$_3$(X)]$^-$), which stabilizes the cationic transition metal species generated by the reaction.

Examples of neutral NCA activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1-20 carbon atoms, alkyl groups having 1-20 carbon atoms, alkoxy groups having 1-20 carbon atoms, and aryl groups having 3-20 carbon atoms (including substituted aryls). More preferably, the three groups are alkyls having 1-4 carbon groups, phenyl, naphthyl or mixtures thereof. Even more preferably, the three groups are halogenated, preferably fluorinated, and aryl groups. Most preferably, the neutral NCA activator is trisperfluorophenyl boron or trisperfluoronaphthyl boron.

Ionic NCA activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299, 5,502,124, and U.S. Ser. No. 08/285,380, filed Aug. 3, 1994, all of which are herein fully incorporated by reference. In this case, the ionic activator reacts with the transition metal compound (pre-catalyst) to form a cationic transition metal species, an anion, and byproduct(s). The byproducts are defined by the cation associated with the ionic NCA activator used.

Compounds useful as an ionic NCA activator comprise a cation, which is preferably a Bronsted acid capable of donating a proton, and a compatible non-coordinating anion, which anion is relatively large (bulky), capable of stabilizing the active catalyst species which is formed when the two compounds are combined and said anion will be sufficiently labile to be displaced by olefinic diolefinic and acetylenically unsaturated substrates or other neutral Lewis bases, such as ethers, nitriles and the like. Two classes of compatible non-coordinating anions have been disclosed in EP-A-0 277 003 and EP-A-0 277 004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the ionic NCA activators include a cation and an anion component, and may be represented by the following formula:

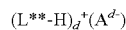

(L**-H)$_d^+$(A$^{d-}$)

wherein L is an neutral Lewis base; H is hydrogen; (L-H)$^+$ is a Bronsted acid; A$^{d-}$ is a non-coordinating anion having the charge d−; d is an integer from 1-3.

The cation component, (L**-H)$_d^+$ may include Bronsted acids such as protons or protonated Lewis bases or reducible Lewis acids capable of protonating or abstracting a moiety, such as an alkyl or aryl, from the pre-catalyst after alkylation.

The activating cation (L-H)$_d^+$ may be a Bronsted acid, capable of donating a proton to the alkylated transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiums from ethers, such as dimethyl ether, diethyl ether, tetrahydrofuran and dioxane, sulfoniums from thioethers, such as diethyl thioethers and tetrahydrothiophene, and mixtures thereof. The activating cation (L-H)$_d^+$ may also be a moiety such as silver, tropylium, carbeniums, ferroceniums and mixtures, preferably carboniums and ferroceniums; most preferably triphenyl carbonium.

The anion component A$^{d-}$ include those having the formula [M$^{k+}$Q$_n$]$^{d-}$ wherein k is an integer from 1-3; n is an integer from 2-6; n−k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl having 1-carbon atoms, more preferably each Q is a fluorinated aryl group, and most preferably each Q is a pentafluoryl aryl group. Examples of suitable A$^{d-}$ also include diboron compounds as disclosed in U.S. Pat. No. 5,447,895, which is fully incorporated herein by reference.

Descriptions of catalysts for coordination polymerization using metallocene cations activated by non-coordinating anions appear in EP-A-0 277 003, EP-A-0 277 004. WO92/00333, and U.S. Pat. Nos. 5,198,401 and 5,278,119, each of which can be herein incorporated by reference in their entirety. These references teach a preferred method of preparation wherein pre-catalysts such as a metallocene can be protonated by an anionic precursor such that an alkyl/hydride group is abstracted from a transition metal to make it both cationic and charge-balanced by the non-coordinating anion. The use of ionizing ionic compounds not containing an active proton but capable of producing both the active metallocene cation and a noncoordinating anion can be also known. See, e.g., EP-A-0 426 637, EP-A-0 573 403 and U.S. Pat. No. 5,387,568, each of which can be herein incorporated by reference in their entirety. Reactive cations other than Bronsted acids capable of ionizing the metallocene compounds include ferrocenium triphenylcarbonium and triethylsilylinium cations. Preferably, discrete ionic activators such as [Me$_2$PhNH][B(C$_6$F$_5$)$_4$], [Ph$_3$C][B(C$_6$F$_5$)$_4$], [Me$_2$PhNH][B((C$_6$H$_3$-3,5-(CF$_3$)$_2$))$_4$], [Ph$_3$C][B((C$_6$H$_3$-3,5-(CF$_3$)$_2$))$_4$], [NH$_4$][B(C$_6$F$_5$)$_4$], [Me$_2$PhNH][B(C$_{10}$F$_7$)$_4$], [Ph$_3$C][B(C$_{10}$F$_7$)$_4$], [Me$_2$PhNH][B(C$_{12}$F$_9$)$_4$], [Ph$_3$C][B(C$_{12}$F$_9$)$_4$], or neutral activators such as B(C$_6$F$_5$)$_3$, B(C$_{10}$F$_7$)$_3$ or B(C$_6$H$_5$)$_3$ can be used (where C$_6$F$_5$ is prefluorophenyl, C$_{10}$F$_7$ is perfluoronaphthyl, C$_6$H$_3$-3,5-(CF$_3$)$_2$ is 3.5-bis(trifluoromethyl)phenyl, C$_{12}$F$_9$ is perfluorobiphenyl).

Polymer in the Polymer Production Process

A polymer refers to chain-like molecules synthesized from one or more repeat units, or monomers, and is meant to encompass homopolymers and copolymers, and includes any polymer having two or more different monomers in the same chain, including random copolymers, statistical copolymers, interpolymers, and block copolymers.

When a polymer is referred to as comprising an olefin, the olefin present in the polymer is the polymerized form of the olefin. A polyolefin is a polymer comprising at least 50 mol. % of one or more olefins. Preferably, a polyolefin comprises at least 60 mol. %, or at least 70 mol. %, or at least 80 mol. %, or at least 90 mol. %, or at least 95 mol. %, or 100 mol. % of one or more olefins, preferably 1-olefins, having carbon numbers of 2 to 20, preferably 2 to 16, or 2 to 10, or 2 to 8, or 2 to 6.

The polymer being produced in the polymer production process for plasticization may have any type of chain architecture, including block, linear, radial, star, branched, hyperbranched, dendritic, and combinations thereof. Exemplary polymers include high density polyethylene (HDPE), low density polyethylene (LDPE), linear low density polyethylene (LLDPE), very low density polyethylene (vLDPE), isotactic polypropylene (iPP), syndiotactic polypropylene (sPP), ethylene-propylene random copolymers typically containing less than 10 wt % ethylene (RCPs), ethylene-propylene plastomers typically containing 65-85 wt % ethylene, ethylene-propylene elastomers typically containing 10-20 wt % ethylene, impact copolymers of ethylene and propylene (ICPs), ethylene-propylene rubbers (EPRs), ethylene-propylene-diene terpolymers (EPDs), ethylene-propylene-butene-1 (EPB) terpolymers, olefin block copolymers, poly(1-butene), styrenic block copolymers, butyl, halobutyl, thermoplastic vulcanizers, and blends thereof.

In the case of elastomers, the polymer which may be produced includes terpolymers comprising ethylene, an alpha-olefin and a diene, also referred to as EODE (Ethylene-alpha-Olefin-Diene Elastomer) of high Mw and greater than 0.3 weight % diene content, preferably greater than 2.0 weight % diene content. These polymers may be largely amorphous and have a low or zero heat of fusion. As used herein the term "EODE" encompasses elastomeric polymers comprised of ethylene, an alpha-olefin, and one or more non-conjugated diene monomers. The non-conjugated diene monomer can be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene; and 1,5-cyclododecadiene; and multi-ring alicyclic fused and bridged ring dienes such as tetrahydroindene, methyl tetrahydroindene, dicyclopentadiene; 5-ethylidene-bicyclo(2,2,1)hept-2-ene alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

In a preferred embodiment, the polymer being produced in the polymer production process is an ethylene-propylene rubber. Preferably, the polymer is an ethylene-propylene-diene rubber (EPDM). In a preferred embodiment, the plasticized polymer is an ethylene-propylene-diene rubber containing 10-100 phr of a plasticizer. As used herein, "phr" refers to parts per hundred of plasticizer ratioed to the neat polymer. In one preferred embodiment, the ethylene-propylene-diene rubber contains about 15 to about 100 phr (about 13 to about 50 wt %) of a plasticizer, preferably a plasticizer a Group I or Group II paraffinic oil (e.g., Sunpar 150, Chevron Paramount 6001).

Of the dienes typically used to prepare EPDMs, the particularly preferred dienes are, 1,4-hexadiene (HD), 5-ethylidene-2-norbornene (Ethylidene Norbornene, ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). The preferred EOD elastomers may contain 20 up to 90 weight % ethylene, more preferably 30 to 85 weight % ethylene, most preferably 35 to 80 weight % ethylene. The alpha-olefin suitable for use in the preparation of elastomers with ethylene and dienes are preferably propylene, 1-butene, 1-pentene, 1-hexene, 1-octene and 1-dodecene. The alpha-olefin is generally incorporated into the EODE polymer at 10 to 80 weight %, more preferably at 20 to 65 weight %. The non-conjugated dienes are generally incorporated into the EODE at 0.5 to 20 to 35 weight %; more preferably at 1 to 15 weight %, and most preferably at 2 to 12 weight %. If desired, more than one diene may be incorporated simultaneously, for example HD and ENB, with total diene incorporation within the limits specified above.

Applications

The plasticized polymer blends produced by the processes disclosed herein are typically used in any known thermoplastic or elastomer application. Non-limiting examples include uses in molded parts, films, tapes, sheets, tubing, hose, sheeting, wire and cable coating, adhesives, shoe soles, bumpers, gaskets, bellows, films, fibers, elastic fibers, nonwovens, spunbonds, sealants, surgical gowns and medical devices. The plasticized polymer blends produced by the processes disclosed herein are particularly advantageous in applications requiring toughness, flexibility, and impact resistance at low temperatures. Non-limiting exemplary applications include polyolefin-based parts used in appliances (e.g., refrigerators, freezers) as wells as parts used in cold temperature environments.

EXAMPLES

In order to provide a better understanding of the foregoing discussion, the following non-limiting examples are offered. Although the examples may be directed to specific embodiments, they are not to be viewed as limiting the invention in any specific respect.

Process simulations were conducted using a thermodynamic model to estimate potential concentration of air and water in a paraffinic extension oil. The process simulations were performed with Invensys SimSci PRO/II with PRO-VISION, Version 9.1 software package, using a cubic equation of state thermodynamic model. A $C_{36}$ alkane, linear hexatriacontane (molecular weight of 507) was used to represent an extension oil like Paramount 6001 (molecular weight of 582, based on ASTM D2502: "Standard Test Method for Estimation of Molecular Weight (Relative Molecular Mass) of Petroleum Oils from Viscosity Measurements."). The predicted equilibrium concentrations at 20° C. and 1 atmosphere absolute are as follows:

| Oxygen | 50 wppm |
| Water | 22 wppm |
| Nitrogen | 88 wppm |

Figure 2:
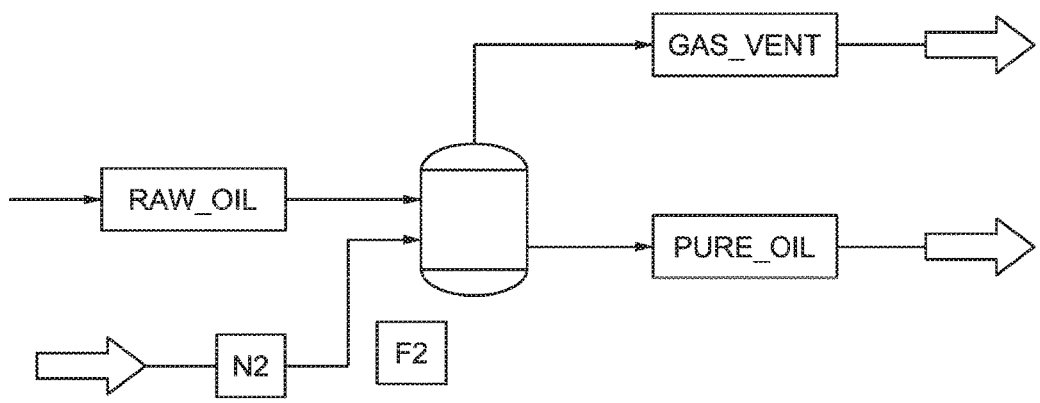
FIG. 2 is a schematic diagram exemplifying gas stripping simulation as described in the Examples.

It should be noted that the actual water content can be higher than the equilibrium concentration if the oil contains a free water layer as a result of handling practices (e.g., water left in hoses, trucks or railcars; exposure of open containers to rainfall). Based on laboratory analysis (GC-MS), a spot sample of Paramount 6001 was also found to contain about 10 wppm (parts per million by weight) of oxygenates with boiling points less than that of toluene (normal boiling point of 111° C.). These were represented in the process simulations as 1-butanol (normal boiling point of 118° C.). FIG. 2 illustrates the gas stripping simulation process exemplified below. Several process simulations were conducted to screen purification methods. These are described below.

Example 1: Contacting Oil with Nitrogen at Ambient Temperature and at Pressure Close to Atmospheric The simulation was conducted using linear hexatriacontane to represent the paraffinic oil. In the simulation, the oil was assumed to be saturated with air and water at 20° C. and 1 atmosphere and to contain 20 wppm of butanol (representing volatile nucleophilic impurities such as oxygenates). No free water was assumed to exist. A single-stage flash was simulated, with oil and nitrogen as feeds (nitrogen rate set at 1% of the oil mass rate) and vapor and liquid stream as products. Flash conditions were 20° C. and 18 psia (about 1.24 bar). A higher pressure than atmospheric was assumed to provide a driving force to send vented vapors to optional treatment facilities.

The predicted equilibrium concentrations are as follows:

| Compound | Before flash (wppm) | After Flash (wppm) | Removal |
|---|---|---|---|
| Oxygen | 50 | 1.5 | 97% |
| Water | 22 | 3.5 | 84% |
| 1-Butanol | 20 | 19.6 | 2% |
| Nitrogen | 88 | 134 | — |

According to the simulation, sparging oil with nitrogen under these conditions significantly reduced the equilibrium concentrations of oxygen and water but had little effect on butanol. The nitrogen concentration increased, due to the elevated pressure. The gas vent stream was essentially free of oil.

Example 2: Contacting Oil with Nitrogen at Elevated Temperature and Elevated Pressure Another simulation was conducted using linear hexatriacontane to represent the paraffinic oil and assuming the oil to be saturated with air and water at 20° C. and 1 atmosphere and to contain 20 wppm of butanol. A single-stage flash was simulated, with oil and nitrogen as feeds (nitrogen rate set at 1% of the oil mass rate) and vapor and liquid stream as products. Flash conditions were 200° C. and 500 psig (about 34.47 bar). The elevated temperature was designed to increase the vapor pressure of volatile impurities and facilitate subsequent processing of the polymer-plasticizer blend that is formed downstream. The elevated pressure was designed to allow the oil to be directed to the polymer production process without additional pressure-increasing equipment (e.g., pump).

The predicted equilibrium concentrations are as follows:

| Compound | Before flash (wppm) | After Flash (wppm) | Removal |
|---|---|---|---|
| Oxygen | 50 | 32 | 37% |
| Water | 22 | 17 | 21% |
| 1-Butanol | 20 | 19 | <1% |
| Nitrogen | 88 | 5500 | — |

According to the simulation, the combination of higher temperature and pressure resulted in less removal of impurities from the oil than in Example 1.

Example 3: Flashing Oil at Elevated Temperature and at Pressure Close to Atmospheric Another simulation was conducted using linear hexatriacontane to represent the paraffinic oil and assuming the oil to be saturated with air and water at 20° C. and 1 atmosphere and to contain 20 wppm of butanol. A single-stage flash was simulated, with oil as the feed (no addition of inert gas) and vapor and liquid stream as products. Flash conditions were 200° C. and 18 psia (about 1.24 bar). The elevated temperature was designed to increase the vapor pressure of volatile impurities and facilitate subsequent processing of the polymer-plasticizer blend that is formed downstream. The low pressure was designed to maximize impurity removal, while providing some driving force to send vented vapors to optional treatment facilities.

The predicted equilibrium concentrations are as follows:

| Compound | Before flash (wppm) | After Flash (wppm) | Removal |
|---|---|---|---|
| Oxygen | 50 | 50 | <<1% |
| Water | 22 | 22 | <<1% |
| 1-Butanol | 20 | 20 | <<1% |
| Nitrogen | 88 | 88 | — |

According to the simulation, essentially no removal of impurities resulted from heating the oil to an elevated temperature without providing a stripping gas.

Example A: Contacting Oil with Nitrogen at Elevated Temperature and at Pressure Close to Atmospheric Another simulation was conducted using linear hexatriacontane to represent the paraffinic oil and assuming the oil to be saturated with air and water at 20° C. and 1 atmosphere and to contain 20 wppm of butanol. A single-stage flash was simulated, with oil and nitrogen as feeds (nitrogen rate set at 1% of the oil mass rate) and vapor and liquid stream as products. Flash conditions were 200° C. and 18 psia (about 1.24 bar). The elevated temperature was designed to increase the vapor pressure of volatile impurities and facilitate subsequent processing of the polymer-plasticizer blend that is formed downstream. The low pressure was designed to maximize impurity removal, while providing some driving force to send vented vapors to optional treatment facilities.

The predicted equilibrium concentrations are as follows:

| Compound | Before flash (wppm) | After Flash (wppm) | Removal |
|---|---|---|---|
| Oxygen | 50 | 1.3 | 97% |
| Water | 22 | 1.0 | 95% |
| 1-Butanol | 20 | 8.0 | 60% |
| Nitrogen | 88 | 194 | — |

According to the simulation, the combination of elevated temperature, pressure close to atmospheric, and use of stripping gas provides a larger reduction in water and butanol concentration than in Examples 1-3.

Example B: Contacting Oil with Nitrogen at Elevated Temperature and at Atmospheric Pressure Another simulation was conducted using linear hexatriacontane to represent the paraffinic oil and assuming the oil to be saturated with air and water at 20° C. and 1 atmosphere and to contain 20 wppm of butanol. A single-stage flash was simulated, with oil and nitrogen as feeds (nitrogen rate set at 1% of the oil mass rate) and vapor and liquid stream as products. Flash conditions were 200° C. and 1 atmosphere absolute. The elevated temperature was designed to increase the vapor pressure of volatile impurities and facilitate subsequent processing of the polymer-plasticizer blend that is formed downstream. The pressure was lower than Example 1 to show the impact on impurity removal.

The predicted equilibrium concentrations are as follows:

| Compound | Before flash (wppm) | After Flash (wppm) | Removal |
|---|---|---|---|
| Oxygen | 50 | 1.1 | 98% |
| Water | 22 | 0.9 | 96% |
| 1-Butanol | 20 | 7.0 | 65% |
| Nitrogen | 88 | 158 | — |

According to the simulation. Example B using a pressure lower than Example 1 provides greater impurity removal in comparison. Therefore, it may be beneficial to operate the flash step at a lower pressure. At equilibrium, oil losses to the vent gas stream are predicted to be very low (e.g., less than 1%).

Example C: Contacting Oil with a Higher Rate of Nitrogen at Elevated Temperature and at Atmospheric Pressure Another simulation was conducted using linear hexatriacontane to represent the paraffinic oil and assuming the oil to be saturated with air and water at 20° C. and 1 atmosphere and to contain 20 wppm of butanol. A single-stage flash was simulated, with oil and nitrogen as feeds (nitrogen rate set at 2% of the oil mass rate) and vapor and liquid stream as products. Flash conditions were 200° C. and 1 atmosphere absolute. The elevated temperature was designed to increase the vapor pressure of volatile impurities and facilitate subsequent processing of the polymer-plasticizer blend that is formed downstream. The low pressure was designed to enhance impurity removal. The nitrogen addition rate was set higher than in Example B to show the impact on impurity removal.

The predicted equilibrium concentrations are as follows:

| Compound | Before flash (wppm) | After Flash (wppm) | Removal |
|---|---|---|---|
| Oxygen | 50 | 0.6 | 99% |
| Water | 22 | 0.4 | 98% |
| 1-Butanol | 20 | 4.2 | 79% |
| Nitrogen | 88 | 159 | — |

According to the simulation, Example C using a higher nitrogen addition rate than Example B provides greater impurity removal in comparison. At equilibrium, oil losses to the vent gas stream are predicted to be very low (e.g., less than 1%).

Example D: Contacting Oil with Methane at Elevated Temperature and at Atmospheric Pressure Another simulation was conducted using linear hexatriacontane to represent the paraffinic oil and assuming the oil to be saturated with air and water at 20° C. and 1 atmosphere and to contain 20 wppm of butanol. A single-stage flash was simulated, with oil and methane gas as feeds (methane rate set at 1% of the oil mass rate) and vapor and liquid stream as products. Flash conditions were 200° C. and 1 atmosphere absolute. The elevated temperature was designed to increase the vapor pressure of volatile impurities and facilitate subsequent processing of the polymer-plasticizer blend that is formed downstream. The low pressure was designed to enhance impurity removal. This example illustrates the impact of using a different stripping gas on impurity removal.

The predicted equilibrium concentrations are as follows:

| Compound | Before flash (wppm) | After Flash (wppm) | Removal |
|---|---|---|---|
| Oxygen | 50 | 0.6 | 99% |
| Water | 22 | 0.5 | 98% |
| 1-Butanol | 20 | 4.7 | 77% |
| Nitrogen | 88 | 0.8 | 99% |
| Methane | 0 | 183 | — |

According to the simulation, Example D using methane instead of nitrogen does not provide as much impurity removal as when compared to Example B. On a mass basis, nitrogen appears to be a more efficient stripping agent than methane in this example.

Example E

Figure 3:
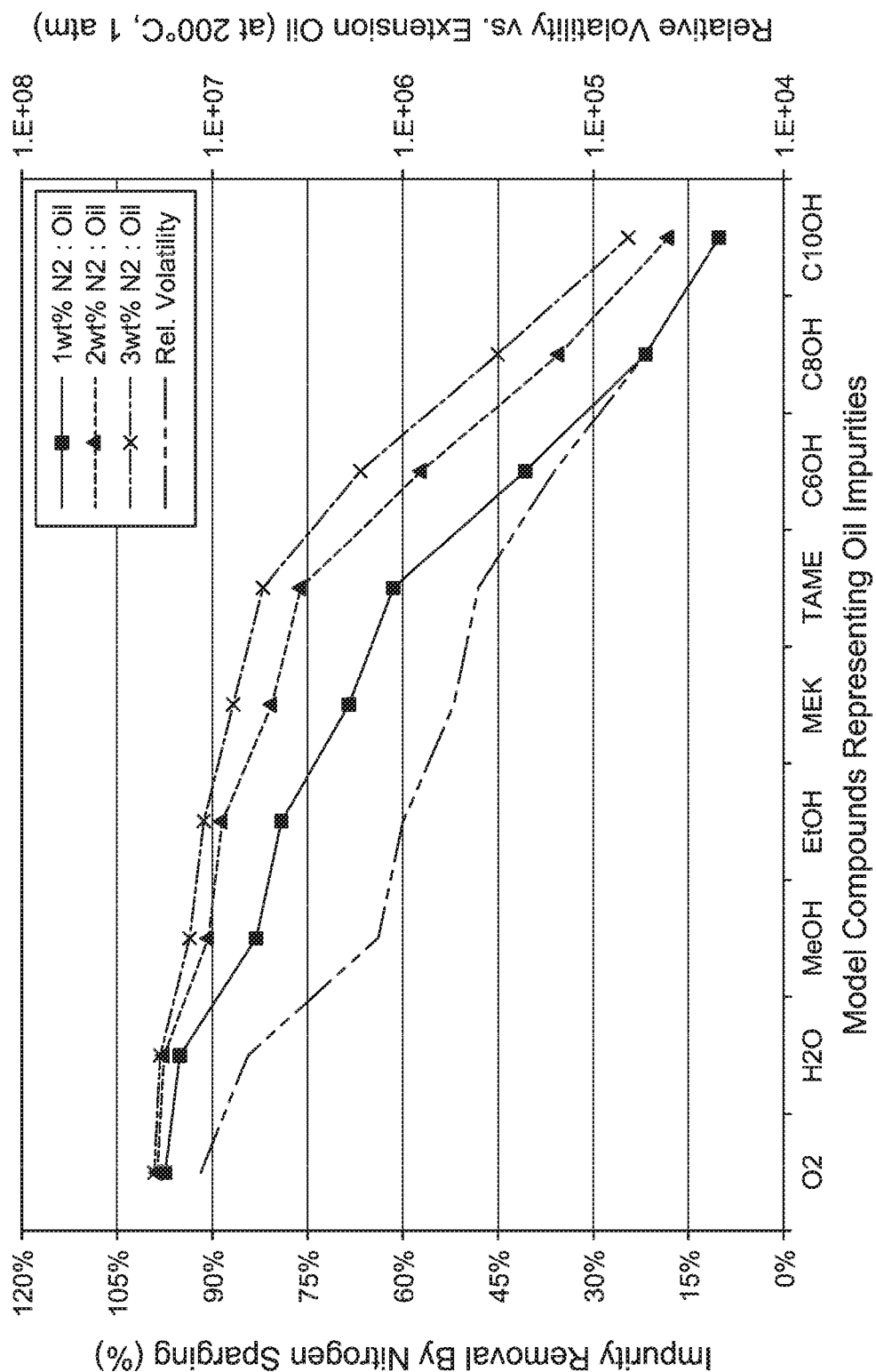
FIG. 3 illustrates simulated results for impurity removal (%) by nitrogen sparging for certain impurities based on their relative volatility relative to an extension oil at 200° C. and 1 atm.

Additional process simulations were conducted using a thermodynamic model to estimate potential concentration of a broader range of oxygenated compounds, varying in volatility, in a paraffinic extension oil. Linear hexatriacontane was used to represent the extension oil. Oxygenates included oxygen ($O_2$), water ($H_2O$), methanol (MeOH), ethanol (EtOH), methyl ethyl ketone (MEK), tert-amyl methyl ether (TAME), 1-hexanol (C6OH), 1-octanol (C8OH), and 1-decanol (C10OH). A single-stage flash was simulated, with oil and nitrogen as feeds (nitrogen rate set at 3% of the oil mass rate) and vapor and liquid streams as products. The oil was assumed to be saturated with air and water at 20° C. and 1 atmosphere, and to contain 1.5 wppm of each of the other oxygenates. Flash conditions were 200° C. and 17 psia (about 1.17 bar). The predicted removal of each oxygenate at equilibrium is shown in FIG. 3. The relative volatility of each oxygenate is also shown. Values of relative volatility were obtained from process simulations of a mixture of hexatriacontane and each oxygenate at 200° C. and 1 atmosphere. As relative volatility increases, so does the efficiency of removal by nitrogen stripping.

Having described the various aspects of the compositions herein, further specific embodiments of the invention include those set forth in the following paragraphs.

Embodiment A

A process for producing a plasticized polymer, comprising the steps of: (a) providing a reactor, a separator (e.g. high-pressure separator) connected to the reactor, and a vessel containing a plasticizer; (b) contacting in the reactor olefin monomers with a catalyst to form a polymer reactor effluent comprising a polymer-monomer mixture, optionally in the presence of a solvent; (c) passing the polymer reactor effluent from the reactor through the separator to form a polymer-rich phase and a polymer-lean phase; (d) separating the polymer-lean phase from the polymer-rich phase; (e) purifying the plasticizer by at least one of: gas stripping, fixed-bed sorption, chemical scavenger, distillation, liquid-liquid extraction, filtration, gravity settling, and centrifugation to produce a purified plasticizer, wherein the purified plasticizer meets at least one of the following impurity removal characteristics, by concentration (wppm) relative to the plasticizer prior to purification (e.g. step (e) of the process): (1) at least 90% of oxygen; (2) at least 90% of water is removed; (3) at least 40% of an impurity having a relative volatility ($\alpha_{ip}$) between $1\times10^5$ and $5\times10^5$ is removed; (4) at least 65% of an impurity having an $\alpha_{ip}$ between $5\times10^5$ and $1\times10^6$ is removed; (5) at least 75% of an impurity having an $\alpha_{ip}$ between $1\times10^6$ and $5\times10^6$ is removed; and (6) at least 90% of an impurity having an $\alpha_{ip}$ greater than $5\times10^6$ is removed, where $\alpha_{ip}$ is the relative volatility of the impurity relative to the plasticizer at 200° C. and 1 atm (f) feeding the purified plasticizer to the process after step (b) to form a plasticized polymer blend stream; and (g) obtaining a plasticized polymer from the plasticized polymer blend stream.

Embodiment B

The process of Embodiment A, wherein the purified plasticizer of step (e) is fed to the polymer-rich phase after step (d).

Embodiment C

The process of Embodiment A or B, wherein the plasticizer is continuously purified and continuously fed to the process.

Embodiment D

The process of any one of Embodiments A to C, wherein the purified plasticizer meets all of the impurity removal characteristics (1) through (6).

Embodiment E

The process of any one of Embodiments A to D, wherein the purified plasticizer meets at least one, and preferably all, of the following impurity removal characteristics, by concentration (wppm) relative to the plasticizer prior to purification (e.g. step (e) of the process); (7) at least 99% of oxygen is removed; (8) at least 98% of water is removed; (9) at least 65% of an impurity having a relative volatility ($\alpha_{ip}$) between $1\times10^5$ and $5\times10^5$ is removed; (10) at least 85% of an impurity having an $\alpha_{ip}$ between $5\times10^5$ and $1\times10^6$ is removed; (11) at least 90% of an impurity having an $\alpha_{ip}$ between $1\times10^6$ and $5\times10^6$ is removed; and (12) at least 98% of an impurity having an $\alpha_{ip}$ greater than $5\times10^6$ is removed, where $\alpha_{ip}$ is the relative volatility of the impurity relative to the plasticizer at 200° C. and 1 atm.

Embodiment F

The process of any one of Embodiments A to E, wherein the plasticized polymer contains at least 5 phr of purified plasticizer.

Embodiment G

The process of any one of Embodiments A to F, wherein the plasticizer comprises or is a mineral oil.

Embodiment H

The process of any one of Embodiments A to G, wherein the plasticizer comprises or is a Group I or Group II paraffinic oil, or a mixture thereof.

Embodiment I

The process of any one of Embodiments A to H, wherein the separator is a high-pressure separator, and the process further comprises a low-pressure separator downstream of the high-pressure separator.

Embodiment J

The process of any one of Embodiments A to I, wherein the polymer being produced in the polymer production process is an ethylene-propylene rubber, preferably an ethylene-propylene-diene rubber containing 10-100 phr of a plasticizer.

Embodiment K

The process of any one of Embodiments A to J, wherein the plasticizer is purified in step (e) by gas stripping, comprising the steps of: (i) heating the plasticizer to a temperature of about 40° C. to about 300° C. to increase the vapor pressure of volatile impurities present in the plasticizer; (ii) contacting the plasticizer with an inert gas using a contacting device to form a purified plasticizer and a vapor product comprising volatile impurities and the inert gas; and (iii) separating the purified plasticizer from the vapor product using a separator device.

Embodiment L

The process of Embodiment K, wherein the contacting device is at least one of a sparger, sintered disc, vapor distributor, in-line mixer, and stripping column.

Embodiment M

The process of Embodiment K or L, wherein the separator device is at least one of a gravity settler, de-entrainment device, and centrifugal separator.

Embodiment N

The process of any one of Embodiments K to M, wherein the vapor product is vented to a gas absorber where volatile impurities are separated from the inert gas, and the inert gas is vented to the atmosphere.

Embodiment O

The process of any one of Embodiments K to N, wherein the inert gas is at least one of nitrogen, a Group 18 element, and a saturated hydrocarbon.

Embodiment P

The process of any one of Embodiments K to O, wherein the inert gas is a saturated hydrocarbon, and the vapor product comprising volatile impurities and the saturated hydrocarbon is vented to a fuel gas system or a flare system.

Embodiment Q

The process of any one of Embodiments K to O, wherein the temperature in step (i) is below at least one of the bubble point and the decomposition point of the plasticizer.

Embodiment R

The process of any one of Embodiments K to Q, wherein the temperature in step (i) is from about 150° C. to about 250° C.

Embodiment S

The process of any one of Embodiments K to R, wherein the plasticizer is contacted with the inert gas in step (ii) at a pressure of about 0.1 atm to 4 atm absolute.

Embodiment T

The process of any one of Embodiments K to S, wherein the mass rate of the inert gas is about 0.1°%/o to about 20% of the mass rate of the plasticizer.

Embodiment U

The process of any one of Embodiments K to U, further comprising after step (ii): cooling the vapor product comprising volatile impurities and the inert gas to condense and form condensed impurities separated from the inert gas; and collecting and recycling the condensed impurities.

Embodiment V

The process of any one of Embodiments K to U, wherein a water is removed from the plasticizer before step (i).

Embodiment W

The process of any one of Embodiments K to V, further comprising purifying the plasticizer before feeding to the process after step (b) by at least one of: fixed-bed sorption, chemical scavenger, distillation, liquid-liquid extraction, filtration, gravity settling, and centrifugation.

Embodiment X

A plant for producing a plasticized polymer, preferably using the process of any of Embodiments A to W, comprising: (a) a feed containing olefin monomers in a hydrocarbon solvent; (b) a reactor to which the olefin monomers and a catalyst are supplied to react to form a polymer reactor effluent, optionally in the presence of a solvent; (c) a separating means downstream of the reactor to separate the hydrocarbon solvent and unreacted olefin monomer from the polymer reactor effluent, which separating means includes a separator (e.g., high-pressure separator) to separate the polymer reactor effluent into a polymer-rich phase and a polymer-lean phase; (d) a recycling means for recycling polymer-lean phase back to the reactor; and (e) a plasticizer supply means for supplying a plasticizer downstream of the reactor, wherein the plasticizer supply means comprises (i) a pressure source, (ii) a heater, (iii) a vessel in which an inert gas is added to a plasticizer, (iv) a contacting device to contact the plasticizer with the inert gas to form a purified plasticizer and a vapor product comprising volatile impurities and the inert gas, (v) a separator device to separate the vapor product from the purified plasticizer, and (vi) a feeding means for feeding the purified plasticizer downstream of the reactor.

Embodiment Y

The plant of Embodiment X, wherein the plasticized polymer is an ethylene-propylene rubber.

While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are also understood as modified by "about."

What is claimed is:

1. A process for producing a plasticized polymer, comprising the steps of:
    (a) providing a reactor, a separator connected to the reactor, and a vessel containing a plasticizer;
    (b) contacting in the reactor olefin monomers with a catalyst to form a polymer reactor effluent comprising a polymer-monomer mixture;
    (c) passing the polymer reactor effluent from the reactor through the separator to form a polymer-rich phase and a polymer-lean phase;
    (d) separating the polymer-lean phase from the polymer-rich phase;
    (e) purifying the plasticizer by gas stripping to produce a purified plasticizer, the gas stripping comprising
        (i) heating the plasticizer to a temperature of about 40° C. to about 300° C. to increase the vapor pressure of volatile impurities present in the plasticizer;
        (ii) contacting the plasticizer with an inert gas using a contacting device to form a purified plasticizer and a vapor product comprising volatile impurities and the inert gas; and
        (iii) separating the purified plasticizer from the vapor product using a separator device;
    (f) feeding the purified plasticizer to the process after step (b) to form a plasticized polymer blend stream, wherein the purified plasticizer meets at least one of the following impurity removal characteristics, by concentration (wppm) relative to the plasticizer prior to purification:
        (1) at least 90% of oxygen is removed;
        (2) at least 90% of water is removed;
        (3) at least 40% of an impurity having a relative volatility ($\alpha_{ip}$) between $1\times10^5$ and $5\times10^5$ is removed;
        (4) at least 65% of an impurity having an $\alpha_{ip}$ between $5\times10^5$ and $1\times10^6$ is removed;
        (5) at least 75% of an impurity having an $\alpha_{ip}$ between $1\times10^6$ and $5\times10^6$ is removed; and
        (6) at least 90% of an impurity having an $\alpha_{ip}$ greater than $5\times10^6$ is removed, where $\alpha_{ip}$ is the relative volatility of the impurity relative to the plasticizer at 200° C. and 1 atm; and
    (g) obtaining a plasticized polymer from the plasticized polymer blend stream.

2. The process of claim 1, wherein the purified plasticizer of step (e) is fed to the polymer-rich phase after step (d).

3. The process of claim 1, wherein the plasticizer is continuously purified and continuously fed to the process.

4. The process of claim 1, wherein the purified plasticizer meets all of the impurity removal characteristics (1) through (6).

5. The process of claim 1, wherein the purified plasticizer meets at least one of the following impurity removal characteristics, by concentration (wppm) relative to the plasticizer prior to step (e):
    (7) at least 99% of oxygen is removed;
    (8) at least 98% of water is removed;
    (9) at least 65% of an impurity having a relative volatility ($\alpha_{ip}$) between $1\times10^5$ and $5\times10^5$ is removed;
    (10) at least 85% of an impurity having an $\alpha_{ip}$ between $5\times10^5$ and $1\times10^6$ is removed;
    (11) at least 90% of an impurity having an $\alpha_{ip}$ between $1\times10^6$ and $5\times10^6$ is removed; and
    (12) at least 98% of an impurity having an $\alpha_{ip}$ greater than $5\times10^6$ is removed, where $\alpha_{ip}$ is the relative volatility of the impurity relative to the plasticizer at 200° C. and 1 atm.

6. The process of claim 5, wherein the plasticized polymer contains at least 5 phr of purified plasticizer.

7. The process of claim 1, wherein the plasticizer is a mineral oil.

8. The process of claim 1, wherein the plasticizer is a Group I or Group II paraffinic oil.

9. The process of claim 1, wherein the separator is a high-pressure separator, and the process further comprises a low-pressure separator downstream of the high-pressure separator.

10. The process of claim 1, wherein the polymer being produced in the polymer production process is an ethylene-propylene-diene rubber containing 10-100 phr of a plasticizer.

11. The process of claim 1, wherein the contacting device is at least one of a sparger, sintered disc, vapor distributor, in-line mixer, and stripping column.

12. The process of claim 1, wherein the separator device is at least one of a gravity settler, de-entrainment device, and centrifugal separator.

13. The process of claim 1, wherein the vapor product is vented to a gas absorber where volatile impurities are separated from the inert gas, and the inert gas is vented to the atmosphere.

14. The process of claim 1, wherein the inert gas is at least one of nitrogen, a Group 18 element, and a saturated hydrocarbon.

15. The process of claim 1, wherein the inert gas is a saturated hydrocarbon, and the vapor product comprising volatile impurities and the saturated hydrocarbon is vented to a fuel gas system or a flare system.

16. The process of claim 1, wherein the temperature in step (i) is below at least one of the bubble point and the decomposition point of the plasticizer.

17. The process of claim 1, wherein the temperature in step (i) is from about 150° C. to about 250° C.

18. The process of claim 1, wherein the plasticizer is contacted with the inert gas in step (ii) at a pressure of about 0.1 atm to 4 atm absolute.

19. The process of claim 1, wherein the mass rate of the inert gas is about 0.1% to about 20% of the mass rate of the plasticizer.

20. The process of claim 1, further comprising after step (ii):

cooling the vapor product comprising volatile impurities and the inert gas to condense and form condensed impurities separated from the inert gas; and collecting and recycling the condensed impurities.

21. The process of claim 1, wherein a water is removed from the plasticizer before step (i).

22. The process of claim 1, further comprising purifying the plasticizer before feeding to the process after step (b) by at least one of: fixed-bed sorption, chemical scavenger, distillation, liquid-liquid extraction, filtration, gravity settling, and centrifugation.

* * * * *